(12) United States Patent
Kim et al.

(10) Patent No.: US 8,117,463 B2
(45) Date of Patent: Feb. 14, 2012

(54) INFORMATION DEVICE, INFORMATION SERVER, INFORMATION PROCESSING SYSTEM, INFORMATION PROCESSING PROGRAM METHOD, AND INFORMATION PROCESSING PROGRAM

(75) Inventors: Sung Yoon Kim, Chiba (JP); Kenichi Tsuchiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 10/519,846

(22) PCT Filed: Jun. 4, 2004

(86) PCT No.: PCT/JP2004/008178
§ 371 (c)(1),
(2), (4) Date: Jan. 13, 2005

(87) PCT Pub. No.: WO2004/109522
PCT Pub. Date: Dec. 16, 2004

(65) Prior Publication Data
US 2005/0229257 A1    Oct. 13, 2005

(30) Foreign Application Priority Data
Jun. 9, 2003 (JP) .................................. 2003-163968

(51) Int. Cl.
*H04L 29/06* (2006.01)
(52) U.S. Cl. ............................... 713/193; 726/3; 726/28
(58) Field of Classification Search ................ 726/2–10, 726/26–30; 713/150, 162–167, 170–173; 380/255, 277–286; 705/50–51
See application file for complete search history.

(56) References Cited

U.S. PATENT DOCUMENTS

| | | | | |
|---|---|---|---|---|
| 5,737,416 | A * | 4/1998 | Cooper et al. .................. | 705/52 |
| 6,430,619 | B1 * | 8/2002 | Sitaraman et al. ............. | 709/225 |
| 6,732,106 | B2 * | 5/2004 | Okamoto et al. .............. | 707/784 |
| 2001/0009006 | A1 * | 7/2001 | Sugahara et al. ............... | 705/51 |
| 2002/0107806 | A1 * | 8/2002 | Higashi et al. .................. | 705/51 |
| 2002/0114466 | A1 * | 8/2002 | Tanaka et al. .................. | 380/232 |
| 2002/0174354 | A1 * | 11/2002 | Bel et al. ........................ | 713/193 |
| 2002/0184515 | A1 * | 12/2002 | Oho et al. ....................... | 713/193 |
| 2003/0084306 | A1 * | 5/2003 | Abburi et al. .................. | 713/188 |

(Continued)

FOREIGN PATENT DOCUMENTS
JP    2002-169726    6/2002
(Continued)

*Primary Examiner* — Kim Vu
*Assistant Examiner* — Darren B Schwartz
(74) *Attorney, Agent, or Firm* — Oblon, Spivak, McClelland, Maier & Neustadt, L.L.P.

(57) ABSTRACT

An information device includes a unit that stores an encrypted content whose use requires a license. The information device also includes a unit that stores the license. The information device further includes a unit that stores user data including (a) grouped device identification information for grouping and identifying a plurality of information devices that includes the information device and whose information devices are configured to decrypt the encrypted content, (b) key information for decrypting the encrypted content and which is commonly provided to a device group that includes the plurality of the information devices, and (c) a group identifier provided to the device group. The unit that stores the user data stores the grouped device identification information and the key information together with the group identifier. The information device also includes a unit that performs a process of decrypting the encrypted content, based on the license and the user data.

24 Claims, 10 Drawing Sheets

U.S. PATENT DOCUMENTS

| | | | |
|---|---|---|---|
| 2003/0110131 A1* | 6/2003 | Alain et al. | 705/51 |
| 2004/0103303 A1* | 5/2004 | Yamauchi et al. | 713/200 |
| 2004/0158731 A1* | 8/2004 | Narin et al. | 713/200 |
| 2004/0215735 A1* | 10/2004 | Nakahara et al. | 709/207 |
| 2004/0225524 A1* | 11/2004 | Narasimhan et al. | 705/1 |
| 2005/0108556 A1* | 5/2005 | DeMello et al. | 713/189 |

FOREIGN PATENT DOCUMENTS

| | | |
|---|---|---|
| JP | 2002-359616 | 12/2002 |
| JP | 2003-132232 | 5/2003 |
| JP | 2004-534291 | 11/2004 |
| WO | WO 02/073378 A2 | 9/2002 |
| WO | 02/080446 | 10/2002 |

\* cited by examiner

FIG. 5A

| GROUP ID | PASSWORD | GROUP INFORMATION | DEVICE ID | SERVICE DATA 113 | |
|---|---|---|---|---|---|
| | | | | LEAF ID | DNK |
| $G_0$ | ABCD | ○○○○ | $D_0$ | $LF_0$ | $DNK_0$ |
| | | | $D_1$ | | |
| | | | $D_2$ | | |
| $G_1$ | EFGH | △△△△ | $D_3$ | $LF_1$ | $DNK_1$ |
| | | | $D_4$ | | |
| $G_2$ | IJKL | ×××× | $D_5$ | $LF_2$ | $DNK_2$ |
| | | | $D_6$ | | |
| | | | $D_7$ | | |
| | | | $D_8$ | | |
| ⋮ | ⋮ | ⋮ | ⋮ | ⋮ | ⋮ |

| LICENSE ID | LICENSE CONTENTS (USE CONDITIONS, ETC.) | GROUP ID OF LICENSED GROUP |
|---|---|---|
| abcdef | ○○○○□□□ | $G_0, G_1, G_2$ |
| ghijkl | □□□○○○○ | $G_0$ |
| mnopqr | △△○○△△○ | $G_1$ |
| stuvws | △△△△○○○ | $G_1$ |
| stuvws | ××××△△△ | $G_2$ |
| ⋮ | ⋮ | ⋮ |

FIG. 8A  EKB= 
Enc (K0, KR)
Enc (K1, KR)

FIG. 8B  DNK0= 
Enc (K00, K0)
Enc (K000, K00)
K000

FIG. 8C  DNK1= 
Enc (K00, K0)
Enc (K001, K00)
K001

FIG. 8D  DNK2= 
Enc (K01, K0)
Enc (K010, K01)
K010

INFORMATION DEVICE, INFORMATION SERVER, INFORMATION PROCESSING SYSTEM, INFORMATION PROCESSING PROGRAM METHOD, AND INFORMATION PROCESSING PROGRAM

TECHNICAL FIELD

The present invention relates to an information device having a function of using a content, an information server issuing a license for the use of a content, an information processing system comprising such an information device and such an information server, an information processing method applicable to such an information processing system, and a program applicable to such an information device and such an information server.

BACKGROUND ART

In recent years, a content exchange system that while a user provides another user with a content such as music data owned by the user via the Internet through the use of a PC (Personal Computer), another user provides the user with a content not owned by the user has been developed.

In the system of this kind, theory holds that if one content exists, all other users can use the content, thereby a large number of users will not purchase the content. As a result, the content as a copyright work does not sell well, so the copyright holder of the content will lose an opportunity to receive a royalty that the copyright holder is supposed to receive every time the content is sold. Therefore, it is socially required to prevent unauthorized copying and use of contents which are not licensed by copyright holders without interfering with the distribution of the contents.

In order to respond such a requirement, for example, as described in Japanese Unexamined Patent Application Publication No. 2002-359616, a technique called OpenMG X (trademark) that while contents can be freely distributed, the contents can be used by only authorized users has been proposed.

The technique is as described below. A client receives an encrypted content from a content server. In the header of the content, license identification information for identifying a license required to use the content is included. The client requests the license from the license server on the basis of the license identification information. When the license server receives the request for the license, the license server executes a charging process, then submits the appropriate license to the client. The client can decode and replay the content on condition that the client holds the license. In the technique, while the contents can be freely distributed, only authorized users can use the contents, so while preventing the unauthorized use of contents, the distribution of contents can be promoted.

According to explosive diffusion of the Internet and rapid deployment of broadband technologies in recent years, it is expected that not only PCs but also electronic devices for consumer electronics called CE (Consumer Electronics) devices will be directly connected to a network. Moreover, it is expected that one user will own a plurality of PCs or CE devices capable of accessing the Internet.

However, when a plurality of devices owned by an individual are connected to a network, a conventional model that contents or licenses are controlled by only one device which downloads the contents or the licenses is not user-friendly. For example, in the case where a user uses his home PC to purchase a content through a network, even if the user wants to use the content in a portable device outside the house, he has no choice but to purchase the content again.

DISCLOSURE OF THE INVENTION

In view of the foregoing, it is an object of the invention to provide an information device, an information server, an information processing system, an information processing method and an information processing program in which in the case where a user obtains a content, which is protected so that only a user obtaining the content in a legitimate manner can replay the content, through the use of his own information device, the content can be used in his other information device.

An information device according to the invention comprises: a first memory means for storing a encrypted and distributed content which can be used on condition that a license is held; a second memory means for storing the license; a third memory means for storing grouped device identification information for grouping and identifying a plurality of information devices which intend to use the content and key information for content decryption commonly provided to each device group together with a group identifier provided to each device group; and a replay means for performing a process of decrypting the content stored in the first memory means on the basis of the stored information in the second memory means and the third memory means to replay the content.

An information server according to the invention comprises: a group registration processing means for associating information about a device group to which an information device intending to use a content belongs with a group identifier and registering the information according to a group registration request from the information device; and a service registration processing means for registering the information device as an object to be serviced according to a service registration request from the information device, associating grouped device identification information for grouping and identifying a plurality of information devices in a device group to which the information device belongs and key information for content decryption with the group identifier and registering the grouped device identification information and the key information, and providing the grouped device identification information and the key information to all information devices in the device group to which the information device belongs.

In an information processing method according to the invention, in an information server, according to a group registration request from an information device which intends to use a content, information about a device group to which the information device belongs is associated with a group identifier and registered, and according to a service registration request from the information device, the information device is registered as an object to be serviced, and grouped device identification information for grouping and identifying a plurality of information devices in a device group to which the information device belongs and key information for content decryption are associated with the group identifier and registered, and the grouped device identification information and the key information are provided to all information devices in the device group to which the information device belongs, and in the information device, a content and a license are stored, the grouped device identification information and the key information provided from the information server are stored together with the group identifier, and on the basis of the contents of the license, the grouped device identification information and the key information, the stored content is decrypted to be replayed.

An information processing system according to the invention comprises an information server and an information device. The information server comprises: a group registration processing means for associating information about a device group to which an information device intending to use a content belongs with a group identifier and registering the information according to a group registration request from the information device; and a service registration processing means for registering the information device as an object to be serviced according to a service registration request from the information device, associating grouped device identification information for grouping and identifying a plurality of information devices in a device group to which the information device belongs and key information for content decryption with the group identifier and registering the grouped device identification information and the key information, and providing the grouped device identification information and the key information to all information devices in the device group to which the information device belongs, and the information device comprises: a first memory means for storing a content; a second memory means for storing a license; a third memory means for storing the grouped device identification information and the key information which are provided from the information server together with the group identifier; and a replay means for decrypting and replaying the content stored in the first memory means on the basis of stored information in the second memory means and the third memory means.

A first information processing program according to the invention enables an information device to execute the steps of: storing an encrypted and distributed content which can be used on condition that a license is held in a first memory means; storing the license in a second memory means; storing grouped device identification information for grouping and identifying a plurality of information devices which intend to use the content and key information for content decryption commonly provided to each device group together with a group identifier provided to each device group in a third memory means; and decrypting the content stored in the first memory means on the basis of the stored information in the second memory means and the third memory means to replay the content.

A second information processing program according to the invention enables an information server to execute the steps of: associating information about a device group to which an information device intending to use a content belongs with a group identifier and registering the information according to a group registration request from the information device; and registering the information device as an object to be serviced according to a service registration request from the information device, associating grouped device identification information for grouping and identifying a plurality of information devices in a device group to which the information device belongs and key information for content decryption with the group identifier and registering the grouped device identification information and the key information, and providing the grouped device identification information and the key information to all information devices in the device group to which the information device belongs.

In the information device or the first information processing program according to the invention, the content and the license are stored, and the grouped device identification information and the key information for content decryption are stored together with the group identifier. On the basis of information included in the license, the grouped device identification information, the key information for content decryption and the group identifier, the content can be decrypted to be replayed and used.

In the information server or the second information processing program according to the invention, a group registration process is performed according to a group registration request from the information device, and a service registration process is performed according to a service registration request from the information device. In the group registration process, information about a device group to be registered is associated with the group identifier and registered. In the service registration process, the information device requesting the registration is registered as an object to be serviced. Moreover, in the service registration process, the grouped device identification information and key information for content decryption are associated with the above group identifier and registered. Further, in the service registration process, the grouped device identification information and the key information are provided to all information devices in a device group to which the information device requesting the registration belongs. As a result, all information devices in the device group have the same grouped device identification information and the same key information.

In the information processing system or the information processing method according to the invention, an effect of the information device or the first information processing program and an effect of the above information server or the second information processing program are exemplified. In other words, all information devices in one device group have the same grouped device identification information and the same key information, and in each information device, the content can be decrypted to be replayed and used.

The basic meanings of terms used in the description are as below.

The "content" means a content portion which is digitalized, encrypted and distributed, and includes text information, image information such as a still image or a moving image, voice information or a combination thereof. For example, the content includes a combination of text information and image information such as an electronic book or electronic newspapers, application software such as a game program and the like. The method of distributing the content is not limited, so the content may be distributed through communications lines such as the Internet or by a recording medium such as a CD-ROM. "Use of a content" means to use information included in the content in a usable (meaningful) form, and includes an action of replaying, viewing or executing the content.

The "information device" includes a dedicated-purpose device for using a content and a general-purpose computer such as a personal computer (PC). In the following description, the information device is simply referred to as "device". The "information server" is a device for providing a license, and broadly includes an information processing device such as a workstation or a PC.

The "license" is information about a use right for enabling the use of a content, and includes use conditions, license identification information for identifying the license and the like. The "device group" is a group of information devices. In general, the device group corresponds to, but is not limited to, a group of a plurality of information devices owned by one user.

The "grouped device identification information" is device identification information in a global level (between device groups) indicating which device group each information device divided into groups belongs to. In other words, it is information provided to each information device for showing that the information device belongs to a device group. Therefore, all information devices in one device group have the same grouped device identification information. The information is treated as secured information which cannot be recognized by the user, so an ordinary user cannot transfer or copy the grouped device identification information between information devices in or outside the device group, or cannot change the grouped device identification information. In the following embodiment, a leaf ID corresponds to a specific example of the grouped device identification information.

The "group identifier" is a kind of label information provided to each device group for the sake of convenience when the device group is formed, and the group identifier can be recognized by the user. The group identifier is used when a new information device is registered in the existing device group. When a user is considered as a device group, the group identifier corresponds to a kind of user identification information. In the following embodiment, a group ID corresponds to a specific example of the group identifier.

The "device identification information" is device identification information in a local level (in a device group) which is used to identify each information device in one device group. The information may be provided to the information device at a manufacturing or purchasing stage, or may be produced by software using random numbers later. In the following embodiment, a device ID corresponds to a specific example of the device identification information.

The "key information" is a key for decryption (decoding) for decrypting an encrypted content and enabling the content to be used. In the invention, a common key is provided to each device group. Therefore, all information devices in one device group have the same key. The key is treated as secured information which cannot be recognized by the user, so an ordinary user cannot transfer or copy the information between information devices in or outside the device group, or cannot change the information. In the following embodiment, a device node key DNK corresponds to a specific example of the key information.

"Charging" is a procedure required to collect an amount for the purchase of the license (for example, a procedure for bank payment).

The "user" generally means, but not limited to, a user as an individual. As long as a licenser permits, the user may mean, for example, one family making livelihood together or a social organization.

The "node" is a branch point, and the "node key" is an encrypted key provided to each node, and the node key is encrypted by a node key directly below the node key. The "device node" is a node corresponding to a device in the bottom layer (a device group in the invention), and the "device node key" is an encrypted key defined corresponding to the device in the bottom layer, and is synonymous with the above "key information". In the invention, the same device node key is provided to information devices in one device group. The "root key" is an encrypted key at the top of a hierarchical tree structure.

BRIEF DESCRIPTION OF THE DRAWINGS

FIGS. 5A and 5B are examples of a group management table and a license table in the information server;

FIGS. 8A through 8D are illustrations of examples of details of a enabling key block and key information applied to the hierarchical tree structure shown in FIG. 7;

BEST MODE FOR CARRYING OUT THE INVENTION

Preferred embodiments of the invention will be described in more detail below referring to the accompanying drawings.

Figure 1:
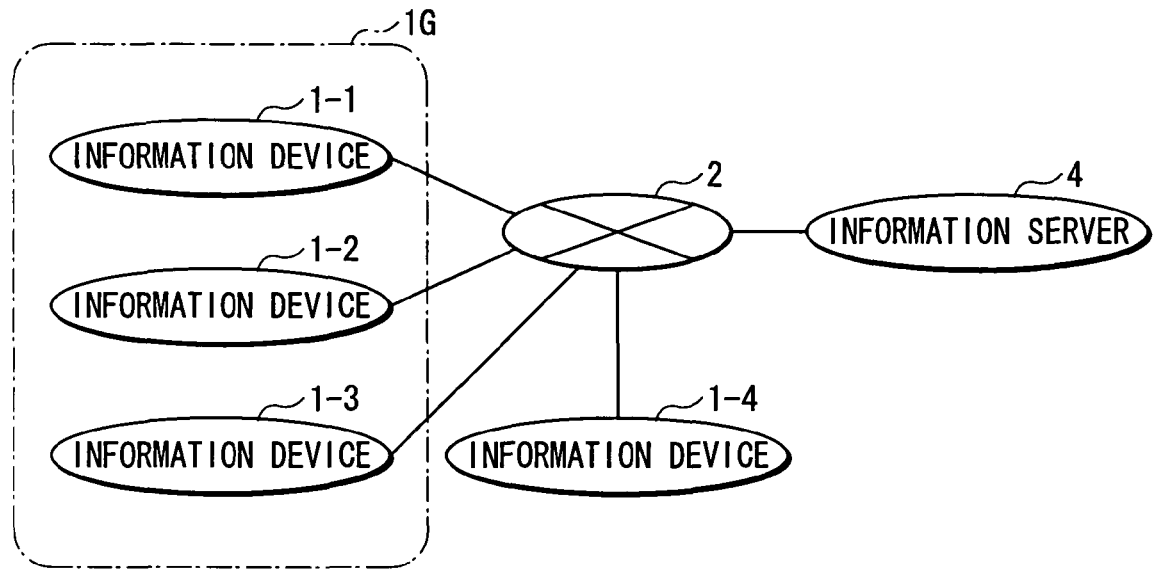
FIG. 1 is a block diagram of the whole structure of an information processing system according to an embodiment of the invention.

FIG. 1 shows the whole structure of an information processing system including an information device and an information server according to an embodiment of the invention. An information processing method and an information processing program according to an embodiment of the invention are exemplified by the information processing system according to the embodiment, so they will be described together with the description of the information processing system.

The information processing system is a content distribution/utilization system comprising information devices 1-1 through 1-4 as clients using a content and an information server 4. The information devices 1-1 through 1-4 and the information server 4 are connected to the Internet 2. The information server 4 includes a content providing function which provides an encrypted content to the information devices 1-1 through 1-4, a license providing function which provides a license required to use the provided content to an information device 1, a service registration function which performs service registration (user registration) which is first required when the information devices 1-1 through 1-4 receive a content distribution/utilization service, and a charging function which charges the information devices 1-1 through 1-4 when the information devices 1-1 through 1-4 receive the license. The service registration function and the license providing function can be implemented through the use of, for example, a right management technology called "OpenMG X".

Among the information devices 1-1 through 1-4, the information devices 1-1 through 1-3 constitute an information device group owned by a user, that is, a device group 1G. On the other hand, the information device 1-4 is owned by another user. The information devices 1-1 through 1-4 may be dedicated-purpose devices having a content replay function or general-purpose PCs. In the following description, one information device belongs to only one device group, so one information device does not belong to a plurality of device groups.

The information devices 1-1 through 1-3 belong to the same device group 1G through a predetermined prior procedure (which will be described later), and can transfer a content and a license to one another to use the content and the license. The information device 1-4 does not belong to the device group 1G, so even if the information device 1-4 receives the content and the license from the information devices 1-1 through 1-3, the information device 1-4 cannot use the content and the license. Likewise, even if the information devices 1-1 through 1-3 receive a content and a license from the information device 1-4, the information devices 1-1 through 1-3 cannot use the content and the license.

In an example shown in FIG. 1, although only four information devices are shown, in reality, any given number of information devices may be connected to the Internet 2. Moreover, although the device group 1G includes three information devices, in reality, any given number of information devices may be included in the device group 1G. Further, in the drawing, although only one device group is shown, in reality, a plurality of device groups can exist.

While each of the information devices 1-1 through 1-3 included in the device group 1G is recognized as a separate hardware device by the information server 4 in a position that the physical identity of the information devices 1-1 through 1-3 is an issue, the information devices 1-1 through 1-3 are recognized as indistinguishable (characterless) information devices by the information server 4 in a position to control the validity of a content license. The above physical identity is judged on the basis of unique device identification information (device ID) that each of the information devices 1-1 through 1-3 has.

On the other hand, the above validity of the license is determined and controlled on the basis of grouped device identification information (hereinafter referred to as leaf ID) and key information DNK (Device Node Key) which are given to each of the information devices 1-1 through 1-3 from the information server 4 in advance. In other words, while each information device in one device group has a different device ID (at least a unique device ID in the device group), the information devices in the device group have the same (common) leaf ID and the same (common) key information DNK. The leaf ID and the key information DNK are treated as secured information which is invisible for (unrecognized by) a user, so the leaf ID and the key information DNK cannot be transferred or copied between the information devices both in and outside the device group. Moreover, the user cannot recognize the leaf ID, so in order to be able to perform various registration procedures that the user should do, a group identifier (group ID) which is also a user ID is given per device group to be used in various registration procedures. The device ID, the leaf ID, the key information DNK and the group ID will be described later (refer to FIGS. 5 and 6).

Figure 2:
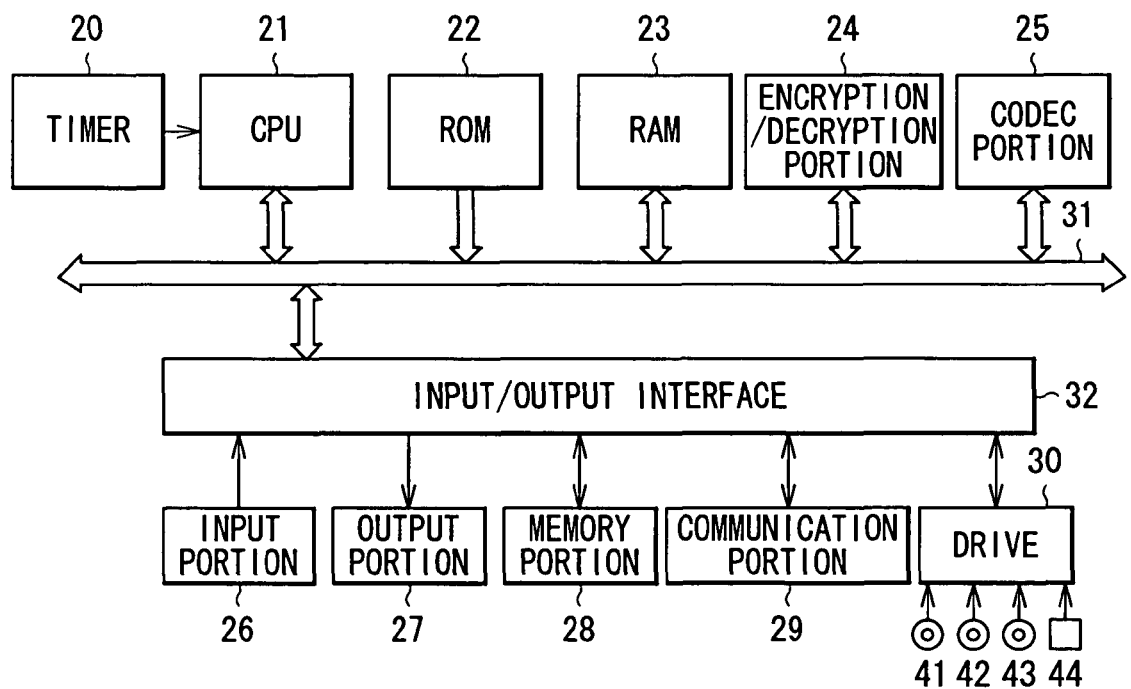
FIG. 2 is a block diagram of a main part of an information device and an information server.

FIG. 2 shows an example of the structure of the information device 1-1.

As shown in FIG. 2, the information device 1-1 includes a CPU (Central Processing Unit) 21, a ROM (Read Only Memory) 22, a RAM (Random Access Memory) 23, an encryption/decryption portion 24, a codec portion 25 and an input/output interface 32. They are connected to one another through a bus 31. An input portion 26, an output portion 27, a memory portion 28, a communication portion 29 and a drive 30 are connected to the bus 31 through the input/output interface 32.

The CPU 21 performs various processes according to a program stored in the ROM 22 or a program loaded on the RAM 23 from the memory portion 28. A timer 20 performs a timing operation to provide time information to the CPU 21.

In the RAM 23, data and the like which are required for the CPU 21 to perform various processes are stored as necessary.

The encryption/decryption portion 24 is provided to perform a process of decrypting (decoding) an encrypted content. As will be described later, in the case where the structure shown in FIG. 2 is applied to the information server 4, the encryption/decryption portion 24 has a function of encrypting a content. The codec portion 25 is provided to compress (encode) a music content in, for example, the ATRAC (Adaptive Transform Acoustic Coding) 3 format or the like to output the content to the input/output interface 32, or to decompress (decode) a compressed content which is inputted from the input/output interface 32 and decrypted in the encryption/decryption portion 24 into replayable data.

The input portion 26 is a keyboard, a mouse or the like, and the output portion 27 is a display such as a CRT (cathode-ray tube) or a LCD (liquid crystal display), a speaker or the like. The memory portion 28 is a hard disk or the like in which in addition to contents and licenses, or various management information is stored. The communication portion 29 is a modem, a terminal adapter or the like, and has a function of performing a communication process through the Internet 2. More specifically, the communication portion 29 performs a communication process for connecting to the information server 4 to download an encrypted content or connecting to the information server 4 to download a license or perform various registration procedures (which will be described later).

In the drive 30, for example, a recording medium such as a removable magnetic disk 41, an optical disk 42, a magneto-optical disk 43 or a semiconductor memory 44 is removably mounted, and a computer program read out from the recording medium is installed in the memory portion 28 as necessary. The drive 30 may read out a content from the recording medium, or may record a content in the recording medium. Further, the optical disk 42 includes a CD-ROM (Compact Disc-Read Only Memory), a CD-R (Recordable), a CD-RW (ReWritable), a DVD (Digital Versatile Disc)-ROM, a DVD-RW, a DVD+RW and the like, and the semiconductor memory 44 is, for example, a memory stick (trademark) or the like.

Other information devices 1-2 through 1-4 also have the same hardware structure as that of the information device 1-1 shown in FIG. 2. Further, the information server 4 is a computer (not shown) having basically the same structure as that of the information device 1-1 shown in FIG. 2. Therefore, in the following description, the structure shown in FIG. 2 is referred to as the structure of the information server 4 as necessary.

Figure 3:
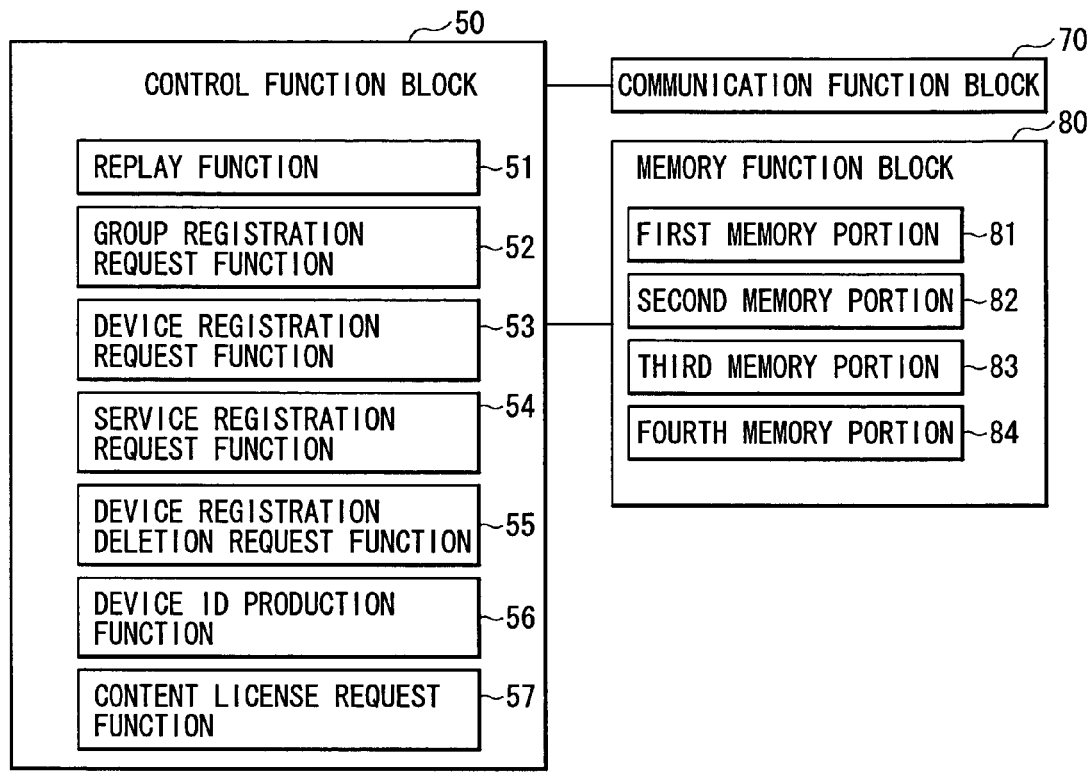
FIG. 3 is a block diagram of a main part of the function structure of an information device.

FIG. 3 shows the function structure of the information device 1-1, and corresponds to the basic structure of an information processing program for clients according to the embodiment. The functions of the information device 1-1 are broadly divided into a control function block 50, a communication function block 70 and a memory function block 80. The control function block 50 includes a replay function 51, a group registration request function 52, a device registration request function 53, a service registration request function 54, a device registration deletion request function 55, a device ID production function 56, and a content-license request function 57. The memory function block 80 includes a first memory portion 81, a second memory portion 82, a third memory portion 83 and a fourth memory portion 84.

The CPU 21, the encryption/decryption portion 24 or the like shown in FIG. 2 is mainly in charge of each function of the control function block 50. The communication portion 29 shown in FIG. 2 is mainly in charge of the communication function block 70, and the memory portion 28 or the RAM 23 is mainly in charge of each function of the memory function block 80.

Each function of the control function block 50 will be described in detail below.

The replay function 51 decrypts and replays a content stored in the first memory portion 81 on the basis of stored information in the second memory portion 82 and the third memory portion 83. The group registration request function 52 is a function of requesting the information server 4 to register a device group to which its device (the information device 1-1) belongs in the information server 4. The device registration request function 53 is a function of requesting the information server 4 to register the device ID stored in the fourth memory portion 84 in the information server 4. The service registration request function 54 is a function of requesting the information server 4 to register its device as an object to be serviced and submit the leaf ID and the key information DNK to the device. The device registration deletion request function 55 is a function of requesting the information server 4 to delete the device ID stored in the fourth memory portion 84 from the registration of the information server 4. The device ID production function 56 is a function of producing a device ID required by the device registration request function 53 to store the device ID in the fourth memory portion 84. The content-license request function 57 is a function of requesting the information server 4 to download a content or a license.

Each function of the memory function block 80 will be described below.

The first memory portion 81 has a function of storing a content provided from the information server 4 or the like, and the second memory portion 82 has a function of storing a license provided from the information server 4. The third memory portion 83 is a function of storing a leaf ID for grouping and identifying a plurality of information devices and key information DNK for content decryption commonly provided to each device group together with a group ID provided to each device group. In the example of FIG. 1, the leaf ID and the key information DNK are commonly provided to the information devices 1-1 through 1-3 included in the device group 1G with one group ID. The fourth memory portion 84 has a function of storing a unique device ID for identifying its device (the information device 1-1) from other information devices 1-2 and 1-3 in the device group 1G.

Figure 4:
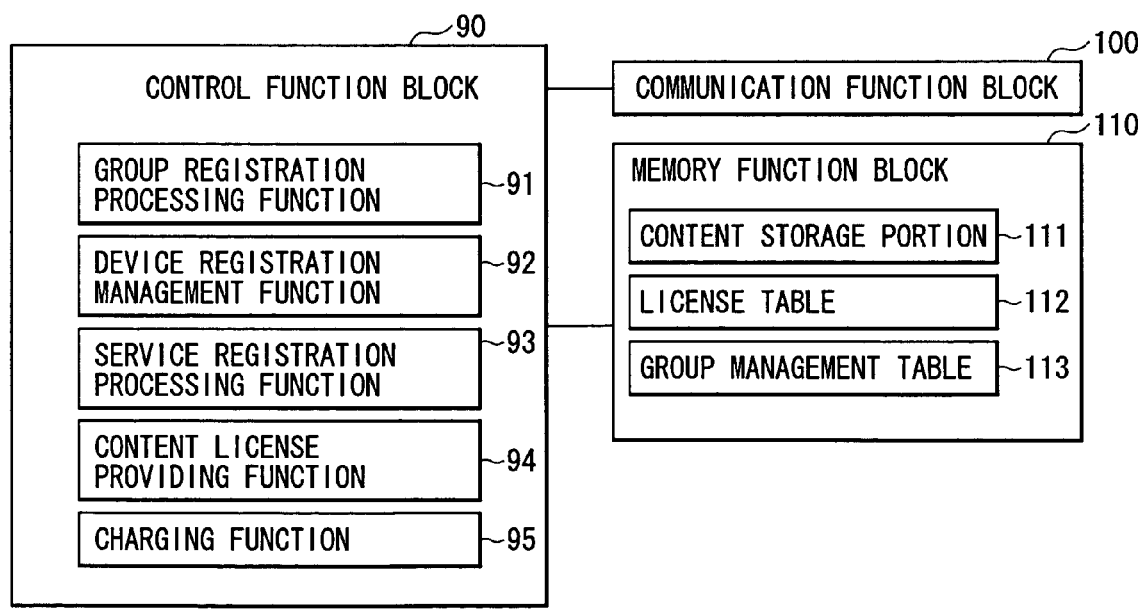
FIG. 4 is a block diagram of a main part of the function structure of an information server.

FIG. 4 shows the function structure of the information server 4, and corresponds to the basic structure of an information processing program for a server in the embodiment. The functions of the information server 4 are broadly divided into a control function block 90, a communication function block 100 and a memory function block 110. The control function block 90 includes a content-license providing function 94, a group registration processing function 91, a device registration management function 92, a service registration processing function 93 and a charging function 95. The memory function block 110 includes a content storage portion 111, a license table 112 and a group management table 113.

The CPU 21, the encryption/decryption portion 24 or the like is mainly in charge of each function of the control function block 90, and the communication portion 29 is mainly in charge of the communication function block 100. The memory portion 28 or the RAM 23 is mainly in charge of the memory function block 110.

Each function of the control function block 50 will be described in detail below.

The content-license providing function 94 is a function of receiving a request for a content including the leaf ID or a request for a license from the information device 1-1 or the like and providing the requested content or license to the information device which requests the content or the license.

The group registration processing function 91 is a function of associating information about a device group to which an information device intending to use a content belongs (group information) with a group identifier and registering the information according to a group registration request from the information device.

The device registration management function 92 is a function of extracting device identification information for identifying each information device from a device registration request from the information device according to the device registration request, associating the device identification with a group identifier and registering the device identification information, and deleting the device identification information specified by a device registration deletion request from the information device from the registration according to the device registration deletion request. The device registration management function 92 also has a function of refusing a device registration request from another information device in the case where the number of device ID registered in a device group reaches a predetermined number.

The service registration processing function 93 is a function of registering an information device as an object to be serviced according to a service registration request from the information device, associating a leaf ID and key information DNK with a group ID to register them in a group management table 113, and providing the registered leaf ID and the registered key information DNK to all information devices in a device group to which the information device belongs. The service registration processing function 93 corresponds to an "OpenMG X" registration process in the embodiment.

The charging function 95 is a function of extracting a leaf ID from a license request from a information device to check whether the extracted leaf ID has been registered by a group registration function, and judging whether or not to charge for providing a license from the content-license providing function 94 according to the result.

Each function of the memory function block 110 will be described in detail below.

The content storage portion 111 previously produces and stores various contents which will be provided according to a request from an information device. For example, as shown in FIG. 5B, the license table 112 is a list table of licenses prepared corresponding to contents. As shown in FIG. 5A, in the group management table 113, a leaf ID and key information DNK associated with a group ID and a device ID associated with a leaf ID are registered. The license table 112 and the group management table 113 will be described in detail below.

FIG. 5A shows an example of the group management table 113. In the group management table 113, a password 122, group information 123, a device ID 124 and service data 125 which are associated with one another are associated with a group ID 121 and registered. In the drawing, a transaction ID (TID) which will be described later is not shown. An associated relationship of the group ID:the password:the device ID:the service data is 1:1:n:1. The value of n is a positive integer.

The group ID 121 and the password 122 are allocated at the group registration, and the device ID 124 is allocated at the device registration, and the service data 125 is allocated at the service registration.

The group registration herein is registration which is performed only once at the beginning, when a user uses a content distribution service by the device group 1G. When the group registration is performed, the user obtains a group ID and a password, and device registration and purchase of a content in the content distribution service can be made through using the group ID and the password.

Moreover, the device registration is a process for a server to manage one or more devices owned by a user as one group.

The service registration is a procedure required when content is used with an information device which is registered in the device registration, and is a process originally performed in order to prevent the use of unauthorized copy of a content through associating each information device with a content decryption key. In the embodiment, content or a license can be freely copied between the information devices in a device group registered in the group registration.

The group registration, the device registration and the service registration will be described in detail later.

The group ID 121 specifies and identifies a device group from other device groups, and is provided to a device group to which an information device requesting group registration belongs according to a group registration request from the information device. As in the case of the embodiment, in the case where one user corresponds to one device group, the group ID 121 corresponds to a user ID. The password 122 is provided together with the group ID 121 at the group registration. The group ID 121 and the password 122 are information provided to each device group from the information server 4 for the sake of convenience when the device group is formed, and they can be recognized by the user. When another information device is registered in the registered device group or when the device registration is deleted, the user is requested to input the group ID 121 and the password 122.

The group information 123 is information about a device group which is provided from the user at the group registration. As in the case of the embodiment, in the case where one user corresponds to one device group, the group information 123 corresponds to the identity of the user (the user's name, address, telephone number, e-mail address, credit card number and the like).

The device ID 124 is device identification information used to identify each information device in one device group, that is, device identification information in a local level (in the device group). In other words, the device ID 124 is different between information devices in a device group, so in this point of view, the device ID 124 is different from the leaf ID commonly provided to the information devices in the device group. By the device ID 124, the number of information devices registered in the device group can be figured out. The device ID 124 is set in the ROM 22 at a manufacturing or purchasing stage in the case where the information device 1-1 is a content-replay-only device; however, in the case where the information device 1-1 is a general-purpose device such as a PC, the device ID 124 is produced by software using random numbers or the like later (for example, at device registration which will be described later). Such software is downloaded from the information server 4 at, for example, the group registration or the device registration to perform the device ID production function 56 shown in FIG. 3.

The service data 125 includes the leaf ID and the key information DNK. The leaf ID is information provided to each information device for grouping and identifying a plurality of information devices which intend to use a content, and corresponds to a specific example of "grouped device identification information" as described above. In other words, the leaf ID is information provided to each information device for showing that the information device belongs to a device group. The key information DNK is a key for content decryption, and a device node key (refer to FIGS. 8B through 8D) including a leaf key provided to a node in the bottom layer in nodes of a hierarchical tree structure (refer to FIG. 7) which will be described later. Common key information DNK is provided to each device group. Therefore, all information devices in one device group have the same leaf ID and the same key information DNK. Through the use of the leaf ID and the key information DNK, a (licensed) content can be freely used in all information devices in one device group. The significance of the leaf ID and the key information DNK will be described in more detail later.

In an example shown in FIG. 5A, a group ID "$G_0$", a password "ABCD", a leaf ID "$L_0$" and key information DNK "$DNK_0$" are provided to the group device 1G (refer to FIG. 1) including the information devices 1-1 through 1-3. The example shows the state where the information devices 1-1, 1-2 and 1-3 belonging to the device group 1G are registered as information devices having device IDs $D_0$, $D_1$ and $D_2$, respectively.

FIG. 5B shows an example of the license table 112. In the license table 112, a license ID 127, license contents 128 and a group ID 129 of the device group to which a license is provided are associated with one another and registered. In the example shown in FIG. 5B, a license with a license ID "abcdef" is associated with three group IDs ("$G_0$", "$G_1$" and "$G_2$"), thereby it is apparent that the license is provided to three device groups with the group IDs.

Figure 6:
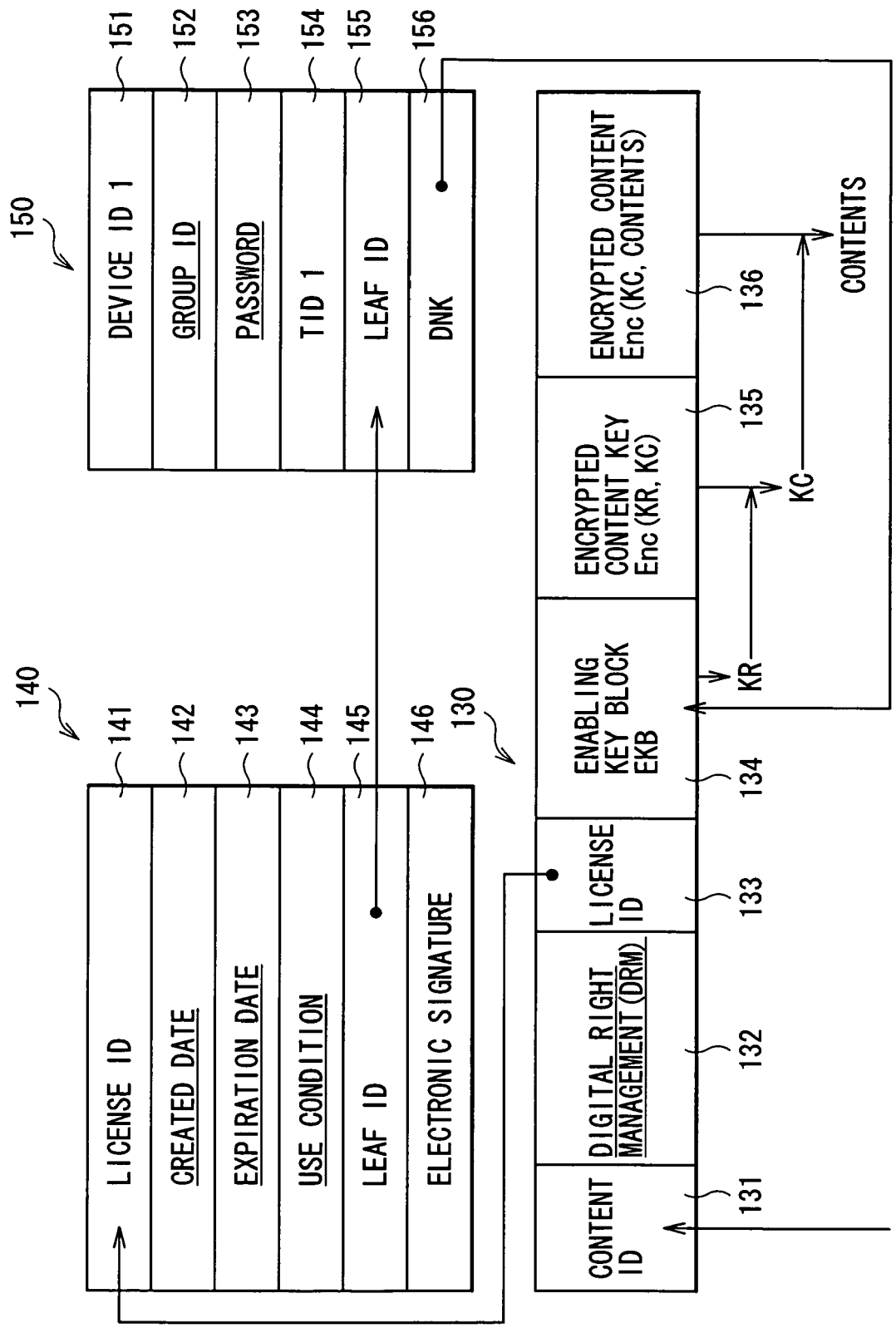
FIG. 6 is an illustration of an example of a content file, a license and user data in the information device.

FIG. 6 shows contents of information stored in the memory function block 80 (refer to FIG. 3) of the information device 1-1. More specifically, for example, FIG. 6 shows contents stored in the memory portion 28 (refer to FIG. 2). In the drawing, underlined information can be recognized (seen) by a user. Moreover, information which is not underlined such as the leaf ID or the key information DNK is secured information which cannot be recognized by the user, so the user cannot perform manipulation such as copy and transfer of the information.

The memory function block 80 stores a content file 130, a license 140 and user data 150. The storage of the content file 130, the license 140 and the user data 150 is supported by the first memory portion 81, the second memory portion 82, and the third memory portion 83, respectively.

At first, the content file 130 will be described below. The content file 130 includes a header portion and a data portion. The header portion includes content identification information (content ID) 131, digital right management (DRM) 132, license identification information (license ID) 133, an enabling key block EKB 134 and an encrypted content key 135. The data portion includes an encrypted content 136. The encrypted content 136 is divided into a plurality of blocks to be encrypted.

The content ID 131 is information for specifying or identifying a content. Further, in addition to the content ID 131, accompanying information such as a codec mode of the content may be included.

The digital right management 132 includes usage rules and status of the content, the URL (uniform resource locator) of a web page of the information server 4 or the like. As the usage rules and status, for example, the number of times that the content is replayed or copied is included. The URL is address information of the information server 4 used not only in the case where the information device 1-1 obtains a license specified by the license ID 133 from the information server 4 but also in the case where a group registration request, a device registration request, a service registration request and a registration deletion request are made.

The license ID 133 identifies a license required to use the encrypted content 136, and is the same as that described in FIG. 5B. The content file 130 and the license 140 are connected to each other by the license ID 133.

The enabling key block EKB 134 is an encrypted portion including at least a root key KR on a path from a bottom layer node key (leaf key) to a top layer node key (root key KR) in the hierarchical tree structure (refer to FIG. 7) which will be described later, and the enabling key block EKB 134 has, for example, a structure shown in FIG. 8A. The encrypted content 136 can be decrypted through the use of the enabling key block EKB 134 and the key information DNK provided from the information server 4. This will be described later referring to FIGS. 7 and 8A through 8D.

The encrypted content key 135 is a content key KC encrypted through the use of the root key KR produced from the enabling key block EKB 134. The encrypted content 136 is encrypted through the use of the content key KC which is obtained through decrypting the encrypted content key 135.

Next, the license 140 will be described below. The license 140 includes a license ID 141, a created date 142, an expiration date 143, a use condition 144, a leaf ID 145 and an electronic signature 146. The license 140 is connected to the user data 150 through including the leaf ID 145. Further, the license ID 141 and the leaf ID 145 are synonymous with those described above (refer to FIGS. 5A and 5B).

The created date 142 is a date when the license 140 is created. The expiration date 143 is an expiration date by which the content can be used on the basis of the license 140. The use condition 144 includes a download expiration date by which the content can be downloaded on the basis of the license, the number of times the content can be copied on the basis of the license (allowed number of copy), the number of checkouts, the maximum number of checkouts, a right to be able to store the content in a recording medium such as a CD-RW or an information device such as a PD (portable device) on the basis of the license, a right to be able to shift the license to a property right (a purchase state), information showing an obligation to keep a log of use and the like.

Next, the user data 150 will be described below. The user data 150 includes a device ID 151, a group ID 152, a password 153, a transaction ID (TID) 154, a leaf ID 155 and key information DNK 156. The user data 150 is connected to the license 140 through including the leaf ID 155. As the key information DNK 156 is included, the content file 130 can be used through the use of the key information DNK 156. The TID 154 is used to connect various registration procedures in FIG. 9 or the like which will be described later to one another, thereby convenience is provided to the user.

The device ID 151, the group ID 152, the password 153, the leaf ID 155 and the key information DNK 156 are synonymous with those described in FIGS. 5A and 5B.

Figure 7:
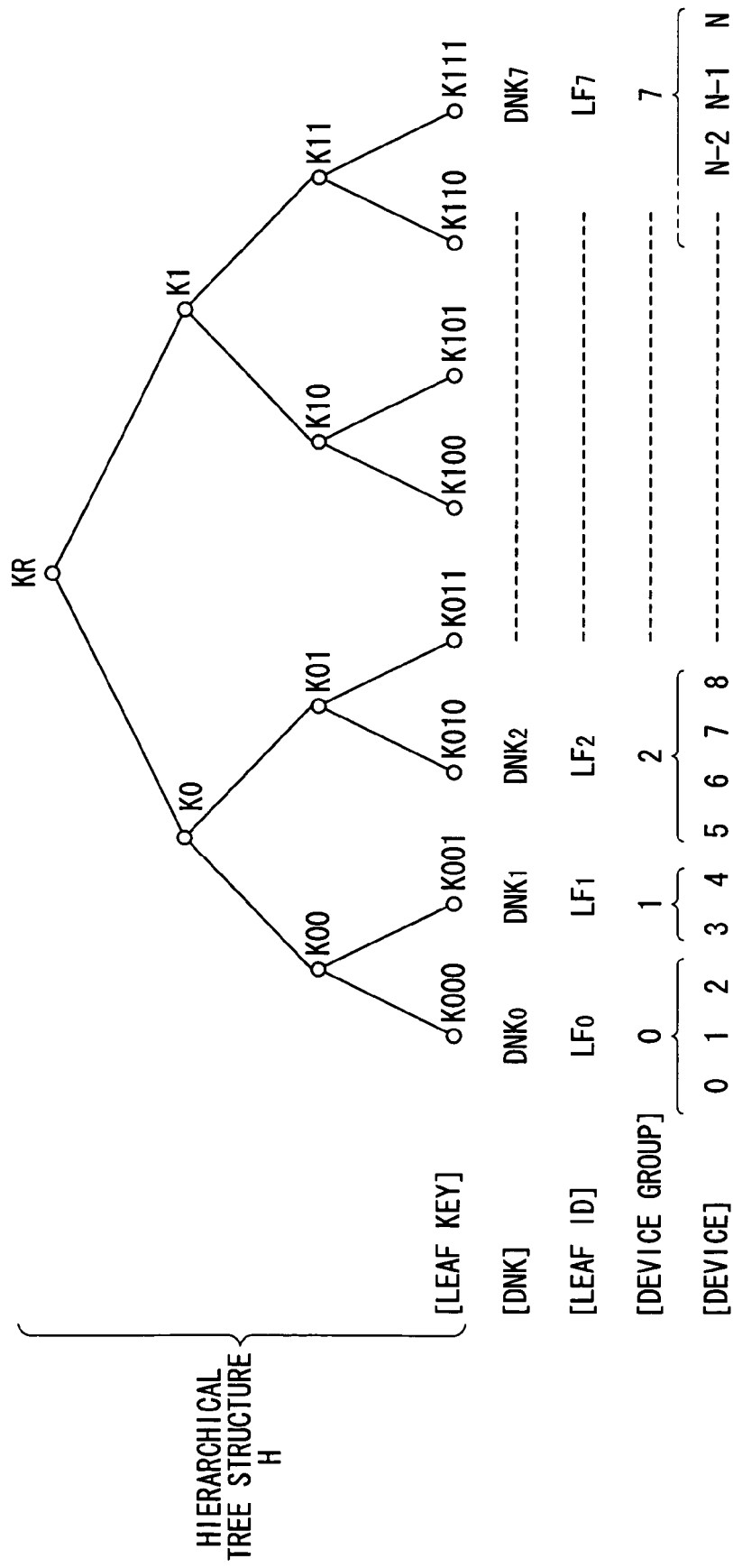
FIG. 7 is an illustration of an example of a hierarchical tree structure in a decryption key controlled by the information server.

FIG. 7 shows an example of a hierarchical tree structure H for controlling an information device (a device) and a license key (a key for content decryption) on the basis of the principle of a broadcast encryption system.

In this control system, each key is determined corresponding to each node marked with a circle in the tree structure. In other words, the keys constitute a hierarchical tree structure from the root key KR in the top layer to the leaf key in the bottom layer. More specifically, the root key KR is determined corresponding to a root node in the top layer, and keys K0 and K1 are determined corresponding to nodes in the second layer. Keys K00 through K11 are determined corresponding to nodes in the third layer, and keys K000 through K111 are determined corresponding to nodes in the bottom layer. For example, a higher key than the key K000 and the key K001 is K00, and a higher key than the key K00 and the key K01 is the key K0, a higher key than the key K0 and the key 1 is the root key KR. The same is true on any other keys, and in the structure, any leaf key is connected to the root key KR through a path from a lower layer to a higher layer. A higher-level key is encrypted by a key directly below the higher-level key.

A node in the bottom layer is called a leaf, as the node in the bottom layer corresponds to the position of a leaf in a tree structure, and the keys K000 through K111 provided to the node is called leaf keys as described above. In the example shown here, as will be described later (refer to FIGS. 8A through 8D), each leaf corresponds to each of eight device groups with numbers 0 through 7. Each leaf key is a part of the key information DNK provided to a corresponding leaf. The key information DNK ($DNK_0$ through $DNK_7$ herein) is set corresponding to eight device groups with number 0 through 7, and in order to specifically identifying each device group, leaf IDs ($LF_0$ through $LF_7$ herein) are provided to the device groups. Each device group includes one or two or more devices (information devices). In the example shown in FIG. 7, a device group [0] includes three devices [0], [1] and [2], a device group [1] includes two devices [3] and [4], and a device group [2] includes four devices [5], [6], [7] and [8]. The other device groups [3] through [7] are the same.

A content provided from the information server 4 is multiply encrypted through the use of each node key on a path from a leaf key in the bottom layer to the root key KR in the top layer in the hierarchical tree structure. Thus, in order to decrypt and use the multiply encrypted content, for example, the enabling key block EKB and the key information DNK with a structure shown in FIGS. 8A through 8D are used.

FIG. 8A shows an example of the enabling key block EKB. In the example shown in FIG. 8A, the enabling key block EKB includes two data Enc(K0, KR) and Enc(K1, KR). Herein, Enc(K0, KR) is data of the root key encrypted by the node key K0 directly below the root key, and Enc(K1, KR) is data of the root key encrypted by the node key K1 directly below the root key KR.

FIGS. 8B through 8D show examples of the key information DNK. As shown in FIG. 8B, the key information $DNK_0$ provided to the device group [0] includes three data Enc(K00, K0), Enc(K000, K00) and the leaf key K000. Enc(K00, K0) is data of the node key K0 encrypted by the node key K00 directly below the node key K0, and Enc(K000, K00) is data of the node key K00 encrypted by the leaf key K000 directly below the node key K00. As shown in FIG. 8C, the key information $DNK_1$ provided to the device group [1] includes three data Enc(K00, K0), Enc(K001, K00) and the leaf key K001. Enc(K00, K0) is data of the node key K0 encrypted by the node key K00 directly below the node key K0, and Enc(K001, K00) is data of the node key K00 encrypted by the leaf key K001 directly below the node key K00. As shown in FIG. 8D, the key information $DNK_2$ provided to the device group [2] includes three data Enc(K01, K0), Enc(K010, K01) and the leaf key K010. Enc(K01, K0) is data of the node key K0 encrypted by the node key K01 directly below the node key K0, and Enc(K010, K01) is data of the node key K01 encrypted by the leaf key K010 directly below the node key K01. The key information $DNK_3$ through $DNK_7$ provided to the other device groups [3] through [7] is the same (not shown).

In FIG. 7, for example, in the device group [2], a path from the leaf key K010 to the root key KR corresponding to the device group [2] is determined by three data Enc(K010, K01), Enc(K01, K0) and Enc(K0, KR). Therefore, the enabling key block EKB shown in FIG. 8A and the key information $DNK_2$ shown in FIG. 8C are combined to sequentially decrypt node keys on the path from the bottom layer to the top layer in the hierarchical tree structure, thereby the root key KR is obtained, and the content can be decrypted through the use of the obtained root key KR. As shown in FIG. 6, the content is not encrypted directly by the root key KR, but the content is encrypted through the use of the encrypted content key Enc (KR, KC) encrypted by the root key KR, so in reality, the encrypted content key Enc(KR, KC) is decrypted by the root key KR at first, and then the encrypted content Enc(KC, CONTENS) is decrypted by the obtained content key KC, thereby a final content CONTENS can be obtained. The same is true on the other device groups.

As a result, only information devices belonging to a device group to which the key information $DNK_i$ [i=0 to 8] is provided can decrypt encryption to use the content.

Thus, in the embodiment, one or two or more devices (information devices) owned by a user are put into one device group, and a leaf node in the bottom layer of the hierarchical tree structure in FIG. 7 is allocated to the device group to provide a leaf ID and key information DNK to the device group. As a result, the same (common) leaf ID and the same (common) key information DNK are provided to all information devices in one device group. For example, in the example shown in FIG. 7, the same leaf ID ($LF_0$) and the same key information $DNK_0$ are provided to three devices [0] through [2] in the device group [0], and the same leaf ID ($LF_1$) and the same key information $DNK_1$ are provided to two devices [3] and [4] in the device group [1], and the same leaf ID ($LF_2$) and the same key information $DNK_2$ are provided to four devices [5] through [8] in the device group [2]. The same is true on devices in any other device group.

Next, referring to FIGS. 9 through 12, the action of an information processing system with the above structure will be described below. FIGS. 9 through 12 show a series of communications between the information devices 1-1 and 1-2 and the information server 4. As an example, the case where the device group 1G including the information devices 1-1 through 1-3 is registered in the information server 4 will be described below. In the following description, the information devices 1-1 and 1-2 initially have device IDs 1 and 2, respectively. However, as described above, the information device may produce and hold a device ID by software in a device registration procedure.

At first, referring to FIG. 9, a process of performing the group registration of the device group 1G by using the information device 1-1, and registering the information device 1-1 as a device belonging to the registered device group 1G will be described below.

Figure 9:
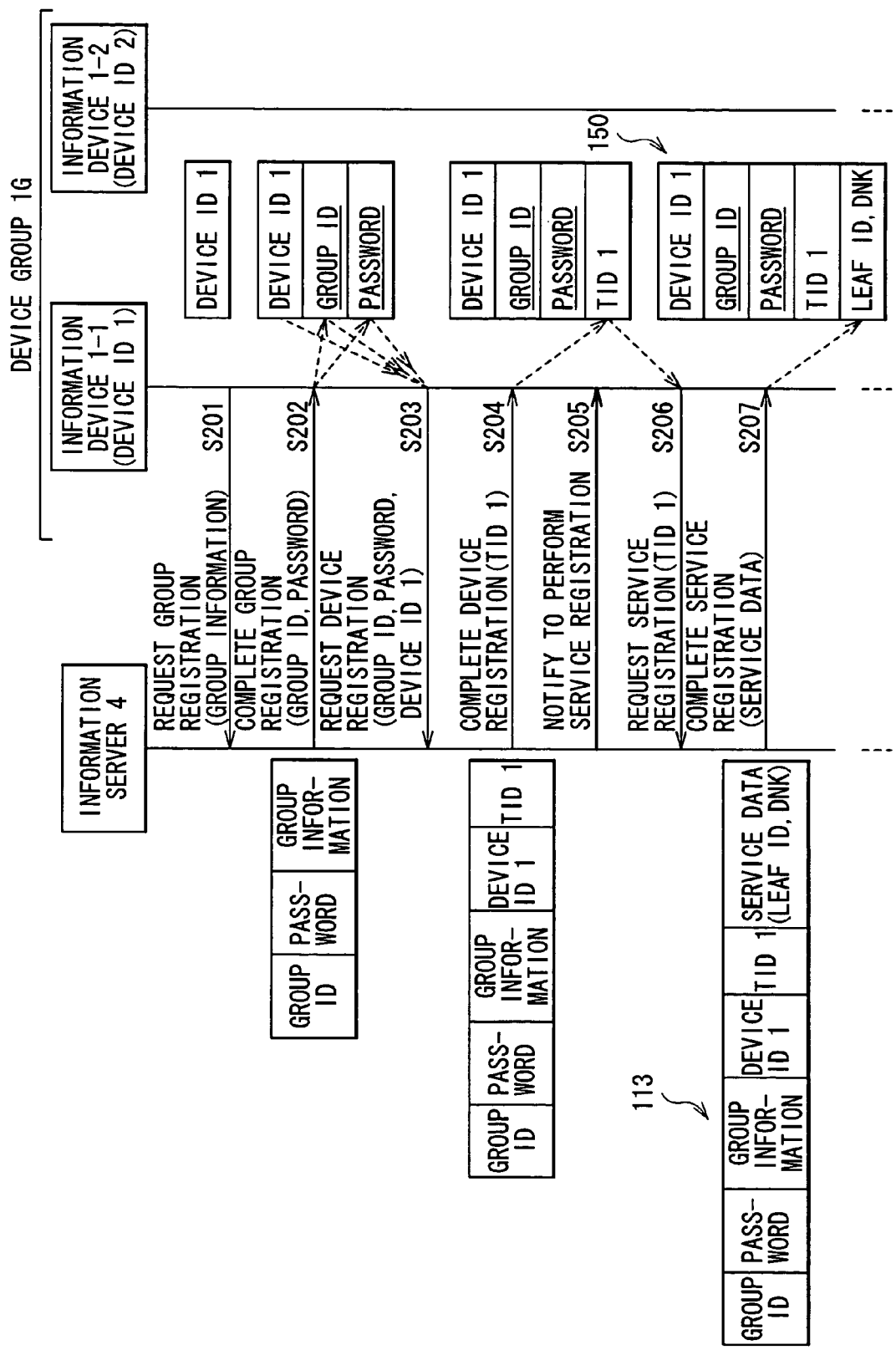
FIG. 9 is an illustration for describing a group registration process, a device registration process and a service registration process which are performed between the information device and the information server.

In the information device 1-1, at first, the group registration request function 52 (refer to FIG. 3) requests the information server 4 through the communication function block 70 to perform group registration (refer to FIG. 9; step S201). The group registration request is performed through accessing a web page of the information server 4. When the user inputs group information (for example, user information such as the user's address, name, telephone number and mail address) about the device group to be registered from the input portion 26 in the web page, and clicks the submit button (not shown), the group information together with the group registration request is submitted to the information server 4 through the communication function block 70.

When the information server 4 receives the group registration request from the information device 1-1 through the communication function block 100, the group registration processing function 91 (refer to FIG. 4) is activated to extract the group information from the group registration request and issue a group ID and a password, and then the group ID and the password together with the group information are registered in a group management table 113 (refer to FIG. 5A). Then, the group registration processing function 91 submits the issued group ID and the issued password together with a notice of the group registration completion to the information device 1-1 through the communication function block 100 (step S202).

When the information device 1-1 receives the notice of the group registration completion from the information server 4 through the communication function block 70, the group registration request function 52 extracts the group ID and the password from the notice of the group registration completion to store them in the user data 150 (refer to FIG. 6) of the third memory portion 83.

Next, in the information device 1-1, the device registration request function 53 requests the information server 4 through the communication function block 70 to perform device registration (step S203). When the user accesses the web page of the information server 4 to input the group ID and the password from the input portion 26 (refer to FIG. 2), and then clicks the submit button, the device registration request is performed. At this time, the device registration request function 53 reads out the device ID 1 from the user data 150 (refer to FIG. 6) to submit the device ID 1 together with the group ID and the password to the information server 4 through the communication function block 70.

When the information server 4 receives the device registration request from the information device 1-1 through the communication function block 100, the device registration management function 92 (refer to FIG. 4) is activated to extract the device ID 1 from the device registration request, and the device ID 1 is associated with the group ID, and is registered in the group management table 113 (refer to FIG. 5A). At this time, the device registration management function 92 issues a transaction ID (TID 1) for associating the present process (a device registration process) with the next process (a server registration process) to associate the TID 1 with the device ID 1 and register the TID 1 in the group management table 113 (refer to FIG. 5A). Then, the device registration management function 92 submits a notice of the device registration completion together with the issued TID 1 to the information device 1-1 through the communication function block 100 (step S204). As will be described later, the TID 1 is used to reduce the user's burden of input in further procedures. Further, as will be described later, when the number of devices to be registered exceeds the maximum number of devices which can be registered, the device registration management function 92 submits a notice of such a case to the information device 1-1.

When the information device 1-1 receives the notice of the device registration completion from the information server 4 through the communication function block 70, the device registration request function 53 extracts the TID 1 from the notice of the device registration completion to store the TID 1 in the user data 150 (refer to FIG. 6) of the third memory portion 83.

In this stage, in the information server 4, the service registration processing function 93 is activated, and the service registration processing function 93 notifies the information device 1-1 of which the device registration is completed through the communication function block 100 to perform service registration (for example, registration on the basis of the above-described "OpenMG X") (step S205).

In the information device 1-1 which is notified to perform the service registration, the service registration request function 54 is activated to request the information server 4 through the communication function block 70 to perform the service registration (step S206). The service registration request is made, for example, when the user clicks the "agreed" button (not shown) in a web page for service registration sent from the information server 4. In other words, when the user clicks the button, the service registration request function 54 reads out the TID 1 from the user data 150 (refer to FIG. 6) to submit the TID 1 together with the service registration request to the information server 4. Therefore, it is not necessary for the user to input the group ID and the password again.

When the information server 4 receives the service registration request from the information device 1-1 through the communication function block 100, the service registration processing function 93 (refer to FIG. 4) is activated to extract the TID 1 from the service registration request, and then the service registration processing function 93 judges which information device requests the service registration and whether the user who owns the information device requesting the service registration has completed the service registration or not on the basis of the extracted TID 1. Here, the service registration processing function 93 judges that the request is from the information device 1-1 belonging to a device group of which the group registration has not been completed, so the service registration processing function 93 issues a leaf ID and key information DNK, and the leaf ID and the key information DNK are associated with the group ID of the information device 1-1, and registered in the group management table 113 (refer to FIG. 5A). Then, the service registration processing function 93 submits service data including the leaf ID and the key information DNK together with a notice of service registration completion to the information device 1-1 through the communication function block 100 (step S207).

When the information device 1-1 receives the notice of the service registration completion from the information server 4 through the communication function block 70, the service registration request function 54 extracts the service data including the leaf ID and the key information DNK from the notice of the service registration completion to store the service data together with the group ID in the user data 150 (refer to FIG. 6) of the third memory portion 83 securely (safely and secretly). At this stage, all prior registration of the information device 1-1 required to use a content are completed. Therefore, the user can access the information server 4 through the information device 1-1 to download a content and a license, and the user can use the downloaded content or can copy and use a content and a license downloaded by the information device 1-2 or the like in the device group 1G from then on. The detailed description will be given later.

Next, referring to FIG. 10, a process in the case where the information device 1-2 is included in the device group 1G will be described below. The process is basically and substantially the same as the process in the case where the information device 1-1 is included in the device group 1G (steps S203 through S207), so it will not be further described.

Figure 10:
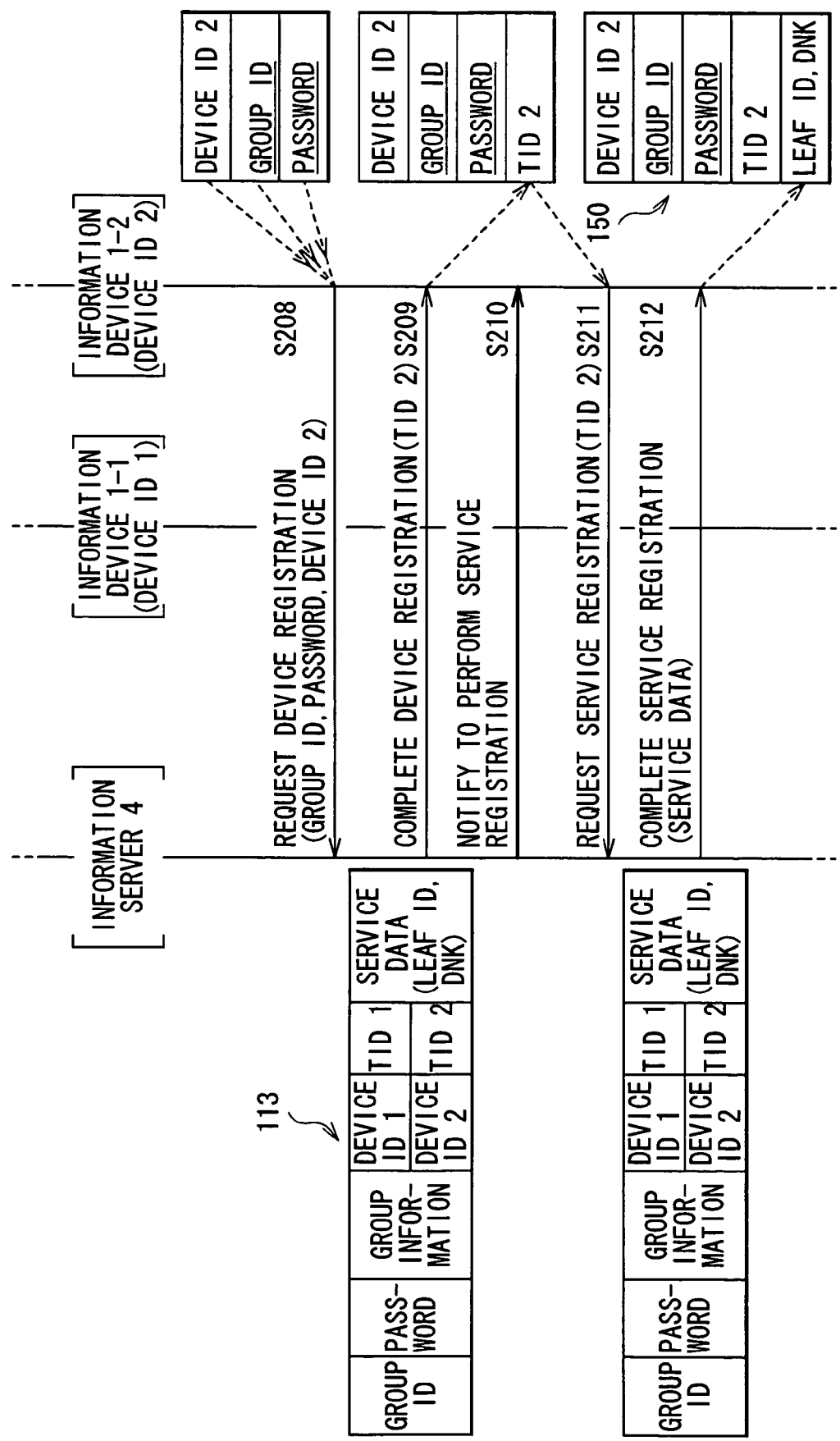
FIG. 10 is an illustration for describing a device registration process and a service registration process which are performed between the information device and the information server.

At first, in the information device 1-2, the device registration request function 53 requests the information server 4 through the communication function block 70 to perform device registration (refer to FIG. 10; step S208). The device registration request is performed, when the user accesses the web page of the information server 4 to input the group ID and the password which have been already obtained by the information device 1-1 from the input portion 26 (refer to FIG. 2), and clicks the submit button. Thereby, the device registration request function 53 reads out the device ID 2 from the user data 150 (refer to FIG. 6) to submit the device ID 2 together with the group ID and the password inputted by the user to the information server 4. At this time, the device registration request function 53 stores the inputted group ID and the inputted password together with the device ID 2 in the user data 150 (refer to FIG. 6) of the third memory portion 83 (refer to FIG. 3).

When the information server 4 receives the device registration request from the information device 1-2 through the communication function block 100, the device registration management function 92 extracts the device ID 2 from the device registration request to associate the device ID 2 with the group ID and additionally register the device ID 2 in the group management table 113 (refer to FIG. 5A). The device registration management function 92 issues a transaction ID 2 (TID 2) to associate the TID 2 with the device ID 2 and register the TID 2 in the group management table 113. Then, the device registration management function 92 submits a notice of device registration completion together with the issued TID 2 to the information device 1-2 through communication function block 100 (step S209). The TID 2 is used for the same purpose as that of the above TID 1.

When the information device 1-2 receives the notice of the device registration completion from the information server 4 through the communication function block 70, the device registration request function 53 extracts the TID 2 from the notice of the device registration completion to store the TID 2 in the user data 150 (refer to FIG. 6) of the third memory portion 83.

At this stage, in the information server 4, the service registration processing function 93 is activated, and notifies the information device 1-2 of which the device registration is completed through the communication function block 100 to perform service registration (step S210). The service registration processing function 93 notifies the information device 1-2, for example, through sending a web page for service registration to the information device 1-2.

In the information device 1-2 which is notified to perform the service registration, the service registration request function 54 is activated to request the information server 4 through the communication function block 70 to perform the service registration (step S211). The service registration request is performed, when the user clicks the "agreed" button (not shown) in the web page for service registration sent from the information server 4 as in the case of the above information device 1-1. In other words, when the user clicks the button, the service registration request function 54 reads out the TID 2 from the user data 150 (refer to FIG. 6) of the third memory portion 83 to submit the TID 2 together with the service registration request to the information server 4. Therefore, it is not necessary for the user to input the group ID and the password again.

When the information server 4 receives the service registration request from the information device 1-2 through the communication function block 100, the service registration processing function 93 (refer to FIG. 4) is activated to extract the TID 2 from the service registration request, and the service registration processing function 93 judges which information device requests the service registration and whether the group registration has been completed or not on the basis of the extracted TID 2. Here, the service registration processing function 93 judges that the request is from the information device 1-2 belonging to the device group 1G of which the group registration has been completed, so the leaf ID and the key information DNK registered corresponding to the group ID of the information device 1-2 are read out from the group management table 113 to submit service data including the leaf ID and the key information DNK together with a notice of service registration completion through the communication function block 100 (step S212).

When the information device 1-2 receives the notice of the service registration completion from the information server 4 through the communication function block 70, the service registration request function 54 extracts the leaf ID and the key information DNK from the notice of the service registration completion to register the extracted information in the user data 150 (refer to FIG. 6) of the third memory portion 83. At this stage, all prior registration of the information device 1-2 required to use a content are completed. Therefore, the user can access the information server 4 through the information device 1-2 to download a content and a license, and the user can use the downloaded content or can copy and use a content and a license downloaded by the information device 1-1 or the like in the device group 1G in the information device 1-2 from then on. The detailed description will be given later.

Likewise, in the case of the information device 1-3 in the device group 1G, through performing the device registration process and the service registration process, the user can access the information server 4 through the information device 1-3 to download a content and a license, and then use the downloaded content or copy and use the content and the license downloaded by the information device 1-1 or the like in the device group 1G in the information device 1-3.

In the embodiment, the device registration procedure is associated with a registration procedure through the use of the transaction ID; however, it is not necessarily required, so it can be removed. In this case, at the service registration request (step S206), the user may be requested to input the group ID and the password.

Thus, the information server 4 recognizes a plurality of information devices owned by the user as one device group; however, if no limit is placed on the device registration, there will be no limit on the use of contents in practical, so a licenser will suffer a larger loss. In order to prevent the loss, in the embodiment, as described above, the number of information devices which can be included in one device group is limited. More specifically, when the information server 4 receives device registration request from an information device, the information server checks the number of device IDs registered in one device group of the group management table 113 (refer to FIG. 5A), and when the number reaches a predetermined number n, the information server 4 refuses the device registration request, and submits a notice of such a case to the information device. In general, the maximum number of information devices that one user can register is determined by service rules of a distribution service provider.

Moreover, for example, in the case where after the number of information device registered by the user reaches the upper limit n of the number of information devices which can be registered, the user wants to register a new information device such as the case where the user replaces the information device owned by the user with a new one, at first, device registration deletion is performed to reduce the number of registered devices, and then the registration of the new information device may be requested. Now, the procedure of the registration deletion will be described below referring to FIG. 11. Here, the registration deletion of the information device 1-2 which has been already registered will be described below.

Figure 11:
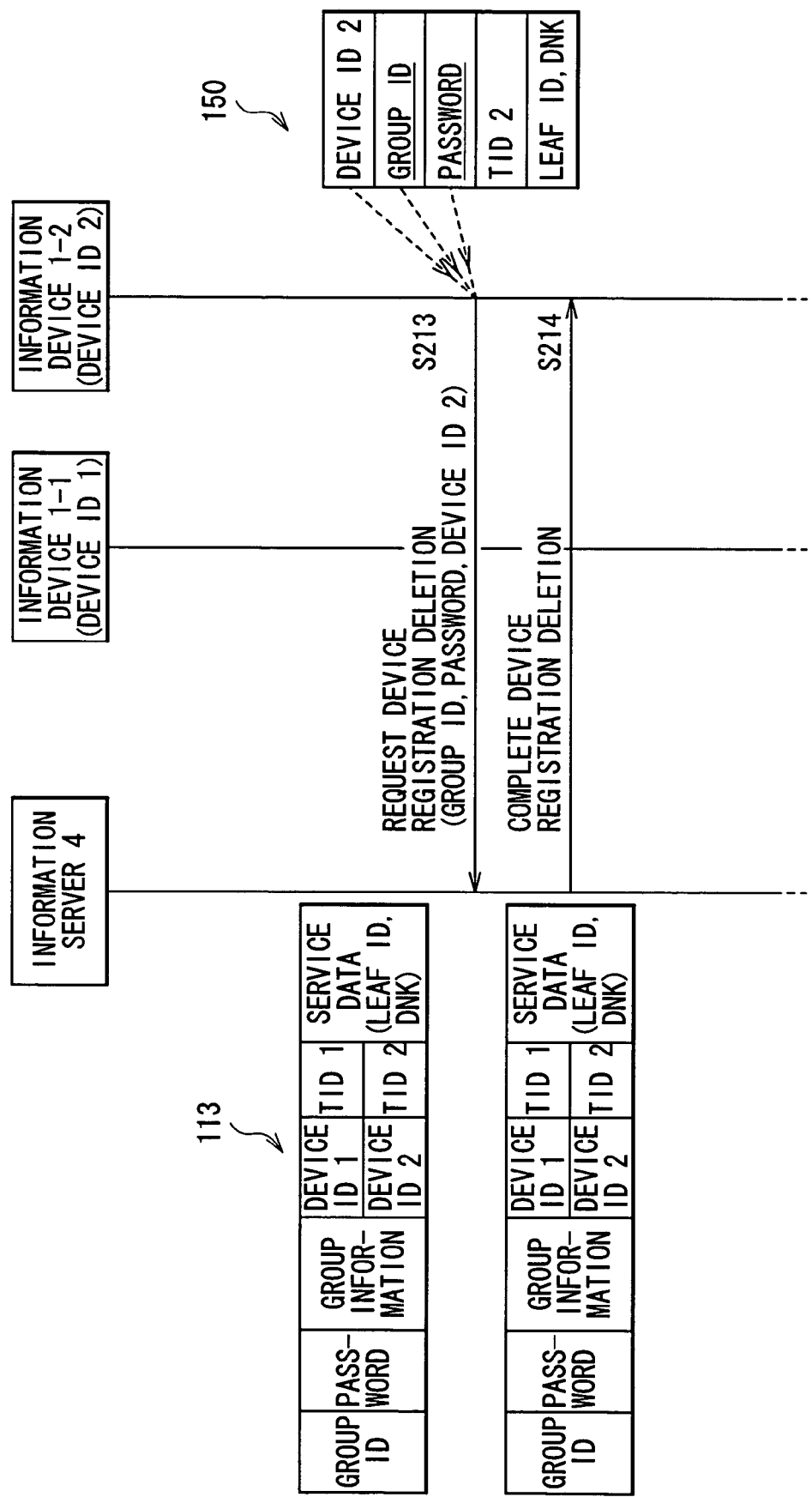
FIG. 11 is an illustration for describing a device registration deletion process which is performed between the information device and the information server.

In this case, at first, in the information device 1-2, the device registration deletion request function 55 requests the information server 4 to perform device registration deletion (refer to FIG. 11; step S213). The device registration deletion request is performed when the user accesses a web page of the information server 4 to input the obtained group ID and the obtained password, and click the submit button. At this time, the device registration deletion request function 55 reads out the device ID 2 from the user data 150 to submit the device ID 2 together with the group ID and the password inputted by the user to the information server 4.

When the information server 4 receives the device registration deletion request from the information device 1-2, the device registration management function 92 extracts the device ID 2 from the device registration request to delete the device ID 2 from the group management table 113. Then, the device registration management function 92 submits a notice of device registration deletion completion to the information device 1-2 (step S214).

When the information device 1-2 receives the notice of the device registration deletion completion from the information server 4, the device registration deletion request function 55 deletes service data including the leaf ID and the key information DNK from the user data 150 of the third memory portion 83. As a result, in an example shown in FIG. 11, only the device ID 1 of the information device 1-1 is left as the device ID registered in the group management table 113, and the information device 1-2 is removed from the device group 1G. Therefore, from then on, an appropriate content cannot be used in the information device 1-2.

Next, referring to FIG. 12, a process of providing/obtaining a content and a license will be described below. The content already produced is stored in the information server 4, so even a person who has not perform the group registration, the device registration and the service registration, or does not obtain the license can download the content; however, without the registration or the license, the content cannot be used, as will be described later.

Figure 12:
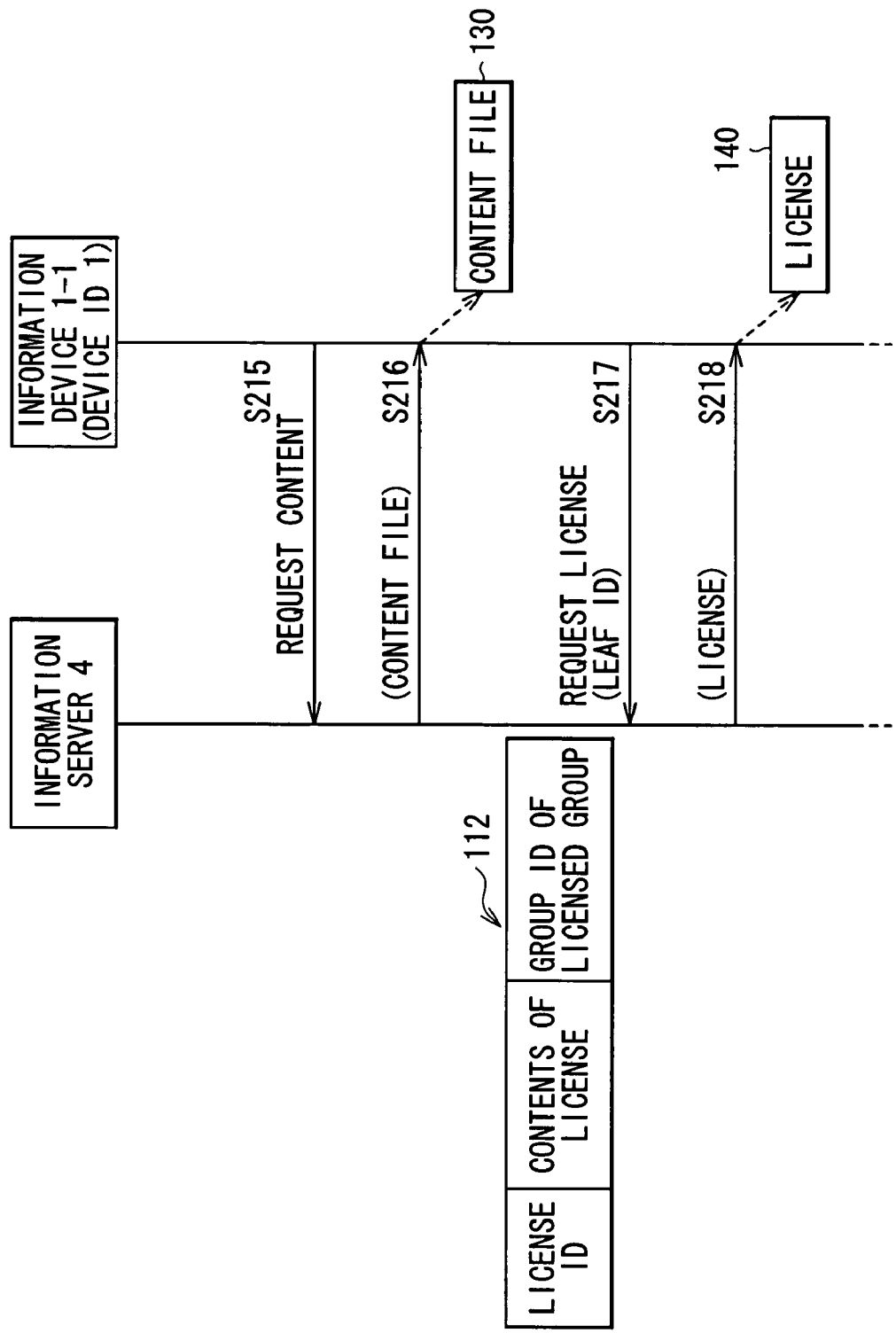
FIG. 12 is an illustration for describing a process of downloading a content and a license which is performed between the information device and the information server.

When the content is downloaded, in the information device 1-1, at first, the content - license request function 57 is activated according to an input operation by the user to request the information server 4 through the communication function block 70 to provide the content (refer to FIG. 12; step S215). More specifically, when the user operates the input portion 26 to specify the content that the user wants, the content-license request function 57 obtains information specifying the content (content specifying information) to submit the content specifying information together with the content request to the information server 4.

When the information server 4 receives the content request from the information device 1-1 through the communication function block 100, the content-license providing function 94 is activated to extract the content specifying information from the received content request. The content-license providing function 94 reads out a content file specified by the extracted content specifying information from the content storage portion 111 to submit the content file to the information device 1-1 through the communication function block 100 (step S216).

When the information device 1-1 receives the content file from the information server 4 through the communication function block 70, the content-license request function 57 stores the content file in the first memory portion 81. Thereby, as shown in FIG. 6, the information device 1-1 can store the content file 130 linked to the license 140 by the license ID.

Next, a procedure of obtaining the license will be described below. Here, the case where the license is purchased through accessing the information server 4 through the use of the information device 1-1 will be described below.

In the case of obtaining the license, in the information device 1-1, at first, the content·license request function 57 is activated according to an input operation by the user to request a license from the information server 4 through the communication function block 70 (refer to FIG. 12; step S217). More specifically, when the user operates the input portion 26 to input the group ID and the password which have been already obtained and specify a license required to use the downloaded content, the content-license request function 57 obtains information specifying the license (license specifying information) and reads out the leaf ID from the user data 150 (refer to FIG. 6), and then submits the leaf ID and the license specifying information together with the license request to the information server 4.

When the information server 4 receives the license request from the information device 1-1 through the communication function block 100, the content-license providing function 94 is activated to extract the leaf ID and the license specifying information from the received license request. The content-license providing function 94 reads out the license ID corresponding to the extracted license specifying information and the contents of the license to add the leaf ID extracted from the license request to them. The contents of the license includes information such as version, created date, expiration date and use conditions. Moreover, a signature is added through the use of a secret key (not shown) to create the license 140 in a format shown in FIG. 6, and submit the license 140 to the information device 1-1 (step S218). At this time, the content-license providing function 94 reads out the group ID corresponding to the leaf ID (in this case, the group ID of the device group 1G to which the information device 1-1 belongs) from the group management table 113 (refer to FIG. 5A), and judges whether the group ID associated with an appropriate license ID (to be provided) is registered in the license table 112 or not. As a result, in the case where the group ID is not registered, the content-license providing function 94 judges that the license has not been purchased by the information device 1-1 yet, so the group ID is associated with the appropriate license ID (to be provided) and registered in the license table 112, and the charging function 95 (refer to FIG. 4) executes a charging process. On the other hand, in the case where the group ID is registered, the charging process is not executed. In the example shown here, it is the first time to obtain the target license in the device group 1G to which the information device 1-1 belongs, so the content-license providing function 94 judges that the license will be purchased, thereby the charging process is executed.

When the information device 1-1 receives the license from the information server 4 through the communication function block 70, the content-license request function 57 stores the content file in the second memory portion 82. Thereby, the information device 1-1 holds the license 140 linked to the user data 150 by the leaf ID as shown in FIG. 6. Therefore, the user can use the content freely through the use of the information device 1-1 within conditions shown in the license.

The license obtaining process can be performed before obtaining the content.

Next, the case of obtaining the same license as that obtained by the information device 1-1 through accessing the information server 4 from the information device 1-2 will be described below.

The license obtaining process in this case is basically the same as the process by the information device 1-1. However, in this case, as the information device 1-1 has already obtained the license, it is the second time to obtain the license in the device group 1G, so in this regard, the information server 4 performs a different process. More specifically, the content-license providing function 94 reads out the group ID corresponding to the leaf ID extracted from the license request from the information device 1-2 (the group ID of the device group 1G to which the information device 1-2 belongs) from the group management table 113 (refer to FIG. 5A) to determine whether the group ID associated with an appropriate license ID (to be provided) is registered in the license table 112 or not. In this case, the group ID has been already registered in the license table 112, so the charging function 95 (refer to FIG. 4) of the information server 4 does not execute the charging process. Any other processes are the same as those in the case where the information device 1-1 obtains (purchases) the license.

Thus, the user can obtain the same license as that purchased from the information server 4 with the information device 1-1 again through the use of the information device 1-2 in the device group 1G without paying again. The license can be obtained again through the use of the information device 1-3 in the device group 1G in the same manner without paying.

Next, referring to FIG. 3 and the like, a process of replaying a content through the use of the information device 1-1 will be described below.

When the user operates the input portion 26 to order the replay of a content, the replay function 51 (refer to FIG. 3) is activated to read out the license ID 133 corresponding to the specified content from the content file 130 (refer to FIG. 6) stored in the first memory portion 81. The replay function 51 judges whether the license corresponding to the license ID 133 is obtained or not. In the case where the replay function 51 judges that the license has been already obtained, the replay function 51 judges whether the obtained license is within the expiration date or not. Whether the license is within the expiration date or not is judged through comparing the expiration date 143 (refer to FIG. 6) specified as a content of the license and the present time kept by the timer 20. In the case where the replay function 51 judges that the expiration date has been already reached, the user is urged to execute a license renewal process or the like.

Next, the replay function 51 reads out the leaf ID 145 from the license 140 (refer to FIG. 6) stored in the second memory portion 82 on the basis of the read license ID 133. Moreover, the replay function 51 reads out the key information DNK 156 from the user data 150 (refer to FIG. 6) of the third memory portion 83 on the basis of the read leaf ID. The replay function 51 decrypts the enabling key block EKB 134 of the contract file 130 (refer to FIG. 6) through the use of the key information DNK 156 to obtain the root key KR. For example, when the information device 1-1 belongs to the device group [0], the enabling key block EKB (refer to FIG. 8A) is decrypted through the use of the key information $DNK_0$ (refer to FIG. 8B). More specifically, at first, Enc(K000, K00) is decrypted by the leaf key K000 in the key information $DNK_0$ to obtain the node key K00, and the Enc(K00, K0) is decrypted by the obtained node key K00 to obtain the node key K0, and then Enc(K0, KR) of the enabling key block EKB is decrypted by the obtained node key K0 to obtain the root key KR. The replay function 51 decrypts the encrypted content key 135 (=Enc(KR, KC)) by the obtained root key KR to obtain the content key KC, and the encrypted content 136 (=Enc(KC, CONTENTS)) is decrypted by the obtained content key KC, and then finally the content CONTENS in a usable form can be obtained. The replay function 51 replays the content decrypted through the above steps to output the content from the output portion 27.

A process of replaying the content through the use of the information device 1-2 or 1-3 is the same as that in the case of the information device 1-1.

There are two methods of obtaining the content and the license in the case of the information devices 1-2 and 1-3. One of the methods is to directly download them from the information server 4 as described above. Another method is to copy the content and the license downloaded from the information server 4 by the information device 1-1 to the information device 1-2. In both methods, the information devices 1-2 and 1-3 can decrypt and replay the obtained content, because the information devices 1-2 and 1-3 have already obtained the service data (including the leaf ID and the key information DNK) required to replay the content through performing the device registration and the service registration in the information server 4.

As described above, in the embodiment, a user (device group) and each information device in the device group are associated with each other and controlled in the information server, and the same service data (the leaf ID and the key information DNK) is written in information devices owned by the same user, thereby a plurality of information devices owned by the user are treated as a device group. Therefore, the same content and the same license can be used in the information devices in the same group. More specifically, for example, if a content and a license in an information device are copied to another information device in the same group through a typical method of operating a file, another information device can replay the content. In other words, when the user downloads the content and the license through the use of an information device, the content can be used in any other information device owned by the user only by a typical copying process. Therefore, it is not necessary to connect each information device to the server through a network many times to download the content.

Moreover, after an information device obtains a content and a license from the information server, another information device in the same group can obtain the same content and the same license from the information server again. At this time, no charging process is executed. Thereby, for example, even if the user is away from his information device storing a content that user wants to use, the user can use the content through the use of any other information device owned by the user at the time.

A summary of the embodiment will be given as below.

(1) In a system of distributing a content protected so that only a user who obtains the content in a legitimate manner can replay the content, the content obtained by the user through the use of an information device can be used in any other information device owned by the user.

(2) A content and a license can be directly transferred between information devices instead of a method of connecting to the server through a network.

(3) The content and the license can be obtained through the use of any other information device belonging to the same group as the information device obtaining the content belongs from the information server through a network without charge.

(4) Even in the case where an information device owned by the user is replaced with a new one, the content which has been already obtained by the user can be used in the new information device.

Although the invention is described referring to the embodiment, the invention is not limited to the embodiment, and is variously modified. For example, in the embodiment, various registration processes and the like are performed by one information server 4; however, the content providing process, the license providing process, the service registration process and the charging process may be performed by different (physically and mechanically separated) servers.

Moreover, in the embodiment, the information device is described as a device which performs various registration procedures or a download process on line with the information server; however, the invention is not limited to this, and the information device may perform the registration procedures off line. In this case, for example, a content, a license and a program for various registration procedures are stored in a portable WORM recording medium such as a CD-R, and a provider distributes the recording medium to the user, and the user installs and executes the program in his information device so that the user can perform various registration procedures and can obtain the content and the license. Therefore, the invention is applicable to the user who has an information device in an environment where the information device cannot be connected to communications lines such as the Internet.

Moreover, in the embodiment, it is described that one user can register one group; however, one user may be able to register a plurality of device groups. One user means, but is not limited to, one individual in general, and as long as a licenser permits, for example, one family making livelihood together or one social organization may be able to be one user. Further, the interior of the user may be hierarchized and controlled. For example, it is applied to the case where one company is considered as one user, and a plurality of departments in the company is considered as a sub-user. In this case, according to the kinds or the contents, properties or distribution modes of the content and license, various management conditions and use conditions are assumed and it is considered profitable.

Further, as the information device, various devices are included. The invention is applicable to, for example, an a dedicated-purpose device such as electronic book device or an electronic dictionary, a general-purpose computer such as a personal computer, and a general-purpose PD device such as a cellular phone. In addition to the above devices, examples of the dedicated-purpose device include an audio reproduction device such as a CD player, a MD (trademark) player or an IC player, a video reproduction device typified by a DVD player, a television with a HD, a game machine and the like.

As described above, in the information device or a first information processing program according to the invention, the content and the license are stored, and grouped device identification information, key information for content decryption and the group identifier are held, and a process of linking information included in the license, the grouped device identification information, the key information for content decryption and the group identifier together is performed to decrypt the content, so information devices with the same grouped device identification information and the same key information can freely use the content.

In the information server and a second information processing program according to the invention, according to a group registration request from a information device, information about a device group to be registered is associated with the group identifier and registered, and according to a service registration request from the information device, the information device requesting the registration is registered as an object to be serviced, and grouped device identification information and key information for content decryption are associated with the group identifier, and are registered, and the grouped device identification information and the key information are provided to all information devices in a device group to which the information device requesting the registration belongs, so all information devices in the device group have the same grouped device identification information and the same key information. Therefore, the content can be freely used in all information devices in the device group. In other words, the content obtained by a user through the use of an information device can be used in another information device owned by the user. Moreover, the content can be used between information devices through not a method of connecting to a server through a network but a method of directly transferring the content or the license between the information devices.

Specifically, in the case where the information device requests to delete registered device identification information from the information server, thereby the information server deletes the registration, the user can replace the information device which is used at the time with a new information device.

Moreover, in the case where the information device includes a device identification information production function, device identification information can be provided to an existing information device to which no device identification information is provided at a later time, so the invention is applicable.

Further, after the number of device identification information registered in a device group reaches a predetermined number, the information server refuses a device registration request from a new information device belonging to the device group, so the number of information devices which can be registered in one device group can be prevented from increasing without limitation.

Moreover, in the case where the license is provided to the information device according to the license request, the grouped device identification information is extracted from the license request, and on the basis of the extracted grouped device identification information, whether the license has been purchased by the device group to which the information device requesting the license belongs or not is judged, and on the basis of the result, whether or not to execute a charging process associated with provision of the license is judged. In this case, once the license is purchased through the use of the information device in the device group, repayment of the license fee in the case of obtaining the license from the information device in the device group again can be avoided.

The invention claimed is:

1. An information device, comprising:
   means for storing
      a content file including an encrypted content and an encrypted key block, and
      a license including grouped device identification information;
   means for receiving key information in response to a transmission of device identification information of the information device and the grouped device identification information over a network and upon a determination that fewer than a predetermined number of information devices are associated with the grouped device identification information, and for receiving the license;
   means for using the content by reading out the grouped device identification information from the license, reading out the key information based on the grouped device identification information, decrypting the encrypted key block based on the key information, and decrypting the encrypted content based on the key block; and
   means for transmitting a deletion request over the network when at least the predetermined number of information devices are associated with the grouped device identification information, the deletion request identifying the grouped device identification information and the device identification information of the information device, wherein, when the information device receives a deletion completion notice after a transmission of the deletion request, the means for using deletes the key information.

2. The information device according to claim 1, wherein the content file includes license identification information identifying the license.

3. The information device according to claim 1, wherein the means for transmitting transmits the transmission to an information server.

4. The information device according to claim 3, wherein the means for receiving receives the grouped device identification information and the key information from the information server.

5. The information device according to claim 3, wherein the means for storing stores the device identification information, which uniquely identifies the information device from the information devices.

6. The information device according to claim 5, wherein the deletion request is submitted to the information server to delete from the information server the device identification information, the deletion request including the device identification information of the information device.

7. The information device according to claim 1, wherein the information devices are owned by one user.

8. The information device according to claim 1, wherein the key information corresponds to a device node key allocated to the information devices, the device node key being a node in a bottom layer among a plurality of node keys in a hierarchical tree structure,
   each of the plurality of node keys is encrypted and corresponds to a different node in the hierarchical tree structure, which branches off from a top layer to the bottom layer,
   the encrypted content is multiply encrypted by each of the plurality of node keys on a path in the hierarchical tree structure from the device node key to a root key, the root key being one of the plurality of node keys in the top layer of the hierarchical tree structure, and
   the means for reading out sequentially decrypts each of the plurality of node keys on the path from the device node key to the root key in the hierarchical tree structure, using the key information as the device node key to obtain the root key, and then decrypts the encrypted content by using the root key.

9. The information device according to claim 8, wherein the encrypted content is encrypted by a content key that is encrypted by the root key, and the means for reading out decrypts the content key by using the root key, and then decrypts the encrypted content using the content key.

10. The information device according to claim 1, wherein the encrypted content includes at least one of text data, still image data, moving image data, or voice data.

11. An information server that enables a use of a content file including an encrypted content and an encrypted key block, the information server comprising:
   determination means for determining whether fewer than a predetermined number of information devices are associated with grouped device identification information;
   means for providing key information, in response to a receipt of device identification information of an information device and grouped device identification information over a network and upon the determination means determining that fewer than the predetermined number of information devices are associated with the grouped device identification information, the grouped device identification information for identifying the key information, the key information for decrypting the encrypted key block, the key block for decrypting the encrypted content;

means for receiving a deletion request when at least the predetermined number of information devices are associated with the grouped device identification information, the deletion request identifying the grouped device identification information and the device identification information of the information device; and means for transmitting a license in response to a reception of an indication of the grouped device identification information, the license including the grouped device identification information, wherein, when the information server receives the deletion request, the determination means deletes the device identification information.

12. The information server according to claim 11, further comprising:

means for receiving the receipt from one of the information devices.

13. The information server according to claim 12, wherein the determination means refuses a device registration request from an information device, after a number of the information devices reaches the predetermined number.

14. The information server according to claim 12, wherein the deletion request is from the one of the information devices.

15. The information server according to claim 11, further comprising:

means for determining whether to charge for transmitting the license from the information server, based on whether the grouped device identification information has been registered by the information server.

16. The information server according to claim 11, wherein the information devices are owned by one user.

17. An information processing system, comprising:

an information server; and an information device configured to receive a service from the information server through communication lines, wherein the information server includes determination means for determining whether fewer than a predetermined number of information devices are associated with grouped device identification information;

means for providing key information in response to a receipt of device identification information of the information device and the grouped device identification information over a network and upon the determination means determining that fewer than the predetermined number of information devices are associated with the grouped device identification information, means for receiving a deletion request when at least the predetermined number of information devices are associated with the grouped device identification information, the deletion request identifying the grouped device identification information and the device identification information of the information device, and means for transmitting a license in response to a reception of an indication of the grouped device identification information, the license including the grouped device identification information, wherein, when the information server receives the deletion request, the determination means deletes the device identification information, and the information device includes means for storing a content file including an encrypted content and an encrypted key block, and the license;

means for transmitting the deletion request; and means for using the content by reading out the grouped device identification information from the license, reading out the key information based on the grouped device identification information, decrypting the encrypted key block based on the key information, and decrypting the encrypted content based on the key block, wherein, when the information device receives a deletion completion after a transmission of the deletion request, the means for using deletes the key information.

18. An information processing method implemented by a decryption apparatus, the information processing method comprising:

storing a content file including an encrypted content and an encrypted key block;

receiving a license including grouped device identification information;

receiving key information in response to a transmission of device identification information of the decryption apparatus and the grouped device identification information over a network and upon a determination that fewer than a predetermined number of decryption apparatuses are associated with the grouped device identification information;

using the content by reading out, with the decryption apparatus, the grouped device identification information from the license, reading out, with the decryption apparatus, the key information based on the grouped device identification information, decrypting the encrypted key block with the decryption apparatus, based on the key information, and decrypting the encrypted content based on the key block;

transmitting a deletion request over the network when at least the predetermined number of information devices are associated with the grouped device identification information, the deletion request identifying the grouped device identification information and the device identification information of the decryption apparatus; and deleting the key information, when the decryption apparatus receives a deletion completion notice after a transmission of the deletion request.

19. An information device, comprising:

a memory configured to store a content file including an encrypted content and an encrypted key block, and a license including grouped device identification information;

an interface configured to receive key information in response to a transmission of device identification information of the information device and the grouped device identification information over a network and upon a determination that fewer than a predetermined number of information devices are associated with the grouped device identification information, and to receive a license; and a processing unit configured to use the content by reading out the grouped device identification information from the license, reading out the key information based on the grouped device identification information, decrypting the encrypted key block based on the key information, and decrypting the encrypted content based on the key block, wherein the interface is further configured to transmit a deletion request over the network, when at least the predetermined number of information devices are associated with the grouped device identification information, the deletion request identifying the grouped device identification information and the device identification information of the information device, wherein, when the information device receives a deletion completion notice after a transmission of the deletion request, the processing unit deletes the key information.

20. An information server, comprising:

a processing unit configured to determine whether fewer than a predetermined number of information devices are associated with grouped device identification information; and an interface configured to provide key information in response to a receipt of device identification information of an information device and grouped device identification information over a network and upon the processing unit determining that fewer than the predetermined number of information devices are associated with the grouped device identification information, the grouped device identification information for identifying the key information, the key information for decrypting an encrypted key block included in a content file, the key block for decrypting an encrypted content included in the content file, to transmit a license in response to a reception of an indication of the grouped device identification information, the license including the grouped device identification information, and to receive a deletion request when at least the predetermined number of information devices are associated with the grouped device identification information, the deletion request identifying the grouped device identification information and the device identification information of the information device, wherein, when the interface receives the deletion request, the processing unit deletes the device identification information.

21. An information processing method for an information server, the method comprising:

determining, with the information server, whether fewer than a predetermined number of information devices are associated with grouped device identification information;

providing key information from the information server in response to a receipt of device identification information of an information device and grouped device identification information over a network and upon determining that fewer than the predetermined number of information devices are associated with the grouped device identification information in the determining, the grouped device identification information for identifying the key information, the key information for decrypting an encrypted content included in a content file, the key block for decrypting an encrypted content included in the content file;

transmitting a license in response to a reception of an indication of the grouped device identification information, the license including the grouped device identification information receiving a deletion request when at least the predetermined number of information devices are associated with the grouped device identification information, the deletion request identifying the grouped device identification information and the device identification information of the information device; and deleting the device identification information, upon the receiving the deletion request.

22. The information device according to claim 5, wherein the means for using produces the device identification information using random numbers.

23. The information device according to claim 1, wherein a number of information devices associated with the grouped device identification information is incremented after the transmission of the device identification information and the grouped device identification information.

24. A computer-readable, non-transitory, storage medium encoded with computer executable instructions, wherein the instructions, when executed by a processing unit, cause the processing unit to perform a method comprising:

receiving key information in response to a transmission of grouped device identification information and device identification information associated with the processing unit and when fewer than a predetermined number of information devices are associated with the grouped device identification information;

reading out grouped device identification information from a license;

reading out, based on the grouped device identification information, the key information;

after the reading out the key information, decrypting an encrypted key block included in a content file, using the key information;

decrypting an encrypted content included in the content file based on the key block transmitting a deletion request identifying the grouped device identification information and the device identification information associated with the processing unit;

receiving a deletion completion notice after the transmitting the deletion request; and deleting the key information, upon the receiving the deletion completion notice.

* * * * *